United States Patent
Saggar et al.

(10) Patent No.: US 12,309,866 B2
(45) Date of Patent: May 20, 2025

(54) SIDELINK ASSISTED INDICATION OF BEAM FAILURE

(71) Applicant: QUALCOMM Incorporated, San Diego, CA (US)

(72) Inventors: Hemant Saggar, San Diego, CA (US); Yan Zhou, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 18/054,536

(22) Filed: Nov. 10, 2022

(65) Prior Publication Data

US 2024/0163950 A1    May 16, 2024

(51) Int. Cl.
  *H04W 76/19*     (2018.01)
  *H04B 7/06*      (2006.01)
  *H04B 17/336*    (2015.01)
  *H04W 88/04*     (2009.01)
  *H04W 92/18*     (2009.01)

(52) U.S. Cl.
  CPC .......... *H04W 76/19* (2018.02); *H04B 7/0695* (2013.01); *H04B 17/336* (2015.01)

(58) Field of Classification Search
  CPC ..... H04W 76/19; H04W 88/04; H04W 92/18; H04B 7/0695; H04B 17/336; H04B 7/06954; H04B 7/06964
  See application file for complete search history.

(56) References Cited

U.S. PATENT DOCUMENTS

| | | | |
|---|---|---|---|
| 10,602,549 B2 * | 3/2020 | Tsai | H04W 76/34 |
| 2016/0226653 A1 * | 8/2016 | Bharadia | H04B 1/525 |
| 2020/0322865 A1 | 10/2020 | Raghavan et al. | |
| 2020/0351944 A1 * | 11/2020 | Wang | H04W 74/0808 |
| 2021/0351838 A1 * | 11/2021 | Zhang | H04B 7/0695 |
| 2021/0352510 A1 * | 11/2021 | Zhang | H04L 1/189 |
| 2022/0014298 A1 * | 1/2022 | Ibrahim | H04B 17/309 |
| 2022/0086658 A1 | 3/2022 | Zhang et al. | |

(Continued)

FOREIGN PATENT DOCUMENTS

WO    WO-2022005683 A1    1/2022

OTHER PUBLICATIONS

International Search Report and Written Opinion—PCT/US2023/075990—ISA/EPO—Jan. 30, 2024 (2206443WO).

*Primary Examiner* — Harry H Kim

(74) *Attorney, Agent, or Firm* — Holland & Hart LLP

(57) ABSTRACT

Methods, systems, and devices for wireless communications at a user equipment (UE) are described. A UE may identify a beam failure for at least one communication beam at the UE. The UE may determine the reasoning for the beam failure and may include the reasoning in a beam failure recovery (BFR) request. The UE may identify a sidelink relay UE to communicate via sidelink channel and transmit the BFR request to the network entity. The network entity may receive the BFR request from the sidelink relay UE and identify beam switching parameters based on the type of interference that caused the beam failure. The network entity may include the beam switching parameters in a BFR response to the UE. The UE may receive the BFR response and switch to another candidate beam to enable communication to the network entity.

30 Claims, 20 Drawing Sheets

(56) References Cited

U.S. PATENT DOCUMENTS

| | | | |
|---|---|---|---|
| 2022/0182992 A1* | 6/2022 | Kim | H04B 7/088 |
| 2023/0055304 A1* | 2/2023 | Shim | H04W 72/541 |
| 2023/0133382 A1* | 5/2023 | Kalantari | H04W 16/28 |
| | | | 375/262 |

* cited by examiner

SIDELINK ASSISTED INDICATION OF BEAM FAILURE

FIELD OF TECHNOLOGY

The following relates to wireless communications, including sidelink assisted indication of beam failure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some wireless communications systems, network devices, such as one or more UEs and network entities may operate in different modes. For example, the network devices may operate in a full duplex (FD) mode, a half-duplex (HD) mode, and a time domain duplex (TDD) mode. In some cases, the network devices operating in multiple modes may experience multiple types of beam failures.

SUMMARY

The described techniques relate to improved methods, systems, devices, and apparatuses that support sidelink assisted indication of beam failure. For example, the described techniques provide for a user equipment (UE) to transmit a beam failure indication to another UE via sidelink and uplink to a network entity. In some wireless communications systems, the UE may identify a beam failure at one or more communication beams at the UE. In some examples, the reasoning for beam failure may be caused by interference, such as a self-interference (SI) or a cross-link interference (CLI). The UE may transmit a beam failure recovery (BFR) request to the network entity using sidelink with another UE. In some cases, the network entity may receive the BFR request that includes the reasoning for the beam failure. The network entity may identify one or more beam switching parameters in response to the BFR request and may transmit a BFR response that indicates the beam switching parameters to the UE.

A method for wireless communication at a UE is described. The method may include identifying a beam failure of at least one communication beam at the UE, transmitting, to a network entity and via a sidelink channel, a BFR request including an indication of whether the beam failure is associated with a SI or a CLI, and receiving a BFR response indicating one or more beam switching parameters based on the BFR request including the indication of whether the beam failure is associated with the SI or the CLI.

An apparatus for wireless communication at a UE is described. The apparatus may include a processor, memory coupled with the processor, and instructions stored in the memory. The instructions may be executable by the processor to cause the apparatus to identify a beam failure of at least one communication beam at the UE, transmit, to a network entity and via a sidelink channel, a BFR request including an indication of whether the beam failure is associated with a SI or a CLI, and receive a BFR response indicating one or more beam switching parameters based on the BFR request including the indication of whether the beam failure is associated with the SI or the CLI.

Another apparatus for wireless communication at a UE is described. The apparatus may include means for identifying a beam failure of at least one communication beam at the UE, means for transmitting, to a network entity and via a sidelink channel, a BFR request including an indication of whether the beam failure is associated with a SI or a CLI, and means for receiving a BFR response indicating one or more beam switching parameters based on the BFR request including the indication of whether the beam failure is associated with the SI or the CLI.

A non-transitory computer-readable medium storing code for wireless communication at a UE is described. The code may include instructions executable by a processor to identify a beam failure of at least one communication beam at the UE, transmit, to a network entity and via a sidelink channel, a BFR request including an indication of whether the beam failure is associated with a SI or a CLI, and receive a BFR response indicating one or more beam switching parameters based on the BFR request including the indication of whether the beam failure is associated with the SI or the CLI.

Some examples of the method, apparatuses, and non-transitory computer-readable medium described herein may further include operations, features, means, or instructions for receiving, from the network entity, an indication of one or more resources associated with a set of multiple beam failure detection reference signals and periodically obtaining at least one of a reference signal received power measurement, a SI measurement, and a CLI measurement based on the one or more resources.

In some examples of the method, apparatuses, and non-transitory computer-readable medium described herein, transmitting the BFR request may include operations, features, means, or instructions for transmitting a control signaling including at least one of an indication of an increased SI, an indication of an increased CLI, an identifier for the SI causing the beam failure, an identifier for the CLI causing the beam failure, a CLI beam indication causing CLI, an uplink beam identifier causing the SI, a transmission-reception point identifier associated with the beam failure, a UE identifier, a cell identifier, an indication of a set of preferred beams for downlink or uplink or both, or a combination thereof.

Some examples of the method, apparatuses, and non-transitory computer-readable medium described herein may further include operations, features, means, or instructions for identifying a set of multiple sidelink relay UEs for transmitting the BFR request and selecting a sidelink relay UE of the set of multiple sidelink relay UEs for transmitting the BFR request based on determining that the UE may be able to connect to the sidelink relay UE using a latency value satisfying a threshold latency value.

Some examples of the method, apparatuses, and non-transitory computer-readable medium described herein may further include operations, features, means, or instructions for identifying the set of multiple sidelink relay UEs for transmitting the BFR request based on each sidelink relay UE of the set of multiple sidelink relay UEs being associated with at least one of a threshold sidelink latency, a threshold uplink latency, a threshold sidelink link quality, a threshold uplink link quality, sidelink relay mode setup parameters, a connectivity between each sidelink relay UE and the network entity, a connectivity between each sidelink relay UE and a second network entity, or a combination thereof.

In some examples of the method, apparatuses, and non-transitory computer-readable medium described herein, transmitting the BFR request may include operations, features, means, or instructions for transmitting, to the sidelink relay UE of the set of multiple sidelink relay UEs, the BFR request based on one or more conditions.

Some examples of the method, apparatuses, and non-transitory computer-readable medium described herein may further include operations, features, means, or instructions for receiving, from the network entity, an indication of the threshold latency value, where the threshold latency value may be based on a random access channel configuration periodicity.

In some examples of the method, apparatuses, and non-transitory computer-readable medium described herein, the UE may be able to connect to the sidelink relay UE using a sidelink grant or sensed sidelink resources.

Some examples of the method, apparatuses, and non-transitory computer-readable medium described herein may further include operations, features, means, or instructions for receiving, from a sidelink relay UE, an indication of at least one of an uplink grant availability at the sidelink relay UE, a periodicity associated with the uplink grant, an offset associated with the uplink grant, a delay to between two uplink grants, time and frequency resources per occasion, a physical layer uplink priority, or a combination thereof, where the uplink grant availability may be based on a scheduling request information, a configured grant information, a dynamic grant information.

Some examples of the method, apparatuses, and non-transitory computer-readable medium described herein may further include operations, features, means, or instructions for receiving, from a sidelink relay UE, a signaling indicating a downlink quality or an estimated uplink quality or both for each cell identifier or network entity identifier associated with the sidelink relay UE, where the signaling includes broadcast signaling or unicast signaling.

Some examples of the method, apparatuses, and non-transitory computer-readable medium described herein may further include operations, features, means, or instructions for receiving, from a sidelink relay UE, an indicator indicating a relaying capability of the sidelink relay UE, where the indicator may be received periodically or periodically.

Some examples of the method, apparatuses, and non-transitory computer-readable medium described herein may further include operations, features, means, or instructions for receiving, from a sidelink relay UE, at least one of a distributed unit identifier, a transmission reception point identifier, a cell identifier, a network entity identifier, or a combination thereof.

In some examples of the method, apparatuses, and non-transitory computer-readable medium described herein, receiving the BFR response may include operations, features, means, or instructions for receiving the BFR response indicating a change in uplink beam or downlink beam for the UE based on whether the beam failure may be associated with the SI or the CLI.

In some examples of the method, apparatuses, and non-transitory computer-readable medium described herein, receiving the BFR response may include operations, features, means, or instructions for receiving the BFR response including a request for the UE to switch from a full-duplex (FD) mode to a half-duplex (HD) mode.

In some examples of the method, apparatuses, and non-transitory computer-readable medium described herein, receiving the BFR response may include operations, features, means, or instructions for receiving the BFR response initiating a beam training procedure using at least one of reference signal received power measurement resources, SI measurement resources, and CLI measurement resources and performing the beam training procedure to establish a second communication beam.

In some examples of the method, apparatuses, and non-transitory computer-readable medium described herein, receiving the BFR response may include operations, features, means, or instructions for receiving the BFR response including a command to reduce power associated with an uplink beam at the UE, where the BFR response may be based on the beam failure being associated with the SI.

In some examples of the method, apparatuses, and non-transitory computer-readable medium described herein, receiving the BFR response may include operations, features, means, or instructions for receiving the BFR response including a command for the UE to switch a first uplink beam to a second uplink beam, where the first uplink beam may have a greater signal interference with the at least one communication beam than the second uplink beam, and where the BFR response may be based on the beam failure being associated with the SI.

Some examples of the method, apparatuses, and non-transitory computer-readable medium described herein may further include operations, features, means, or instructions for determining that a signal interference between the second uplink beam and the at least one communication beam may be greater than a threshold value and switching to a HD mode from a FD mode or canceling an uplink transmission based on the signal interference being greater than the threshold value.

In some examples of the method, apparatuses, and non-transitory computer-readable medium described herein, receiving the BFR response may include operations, features, means, or instructions for receiving the BFR response including a trigger to initiate a process for uplink beam selection with signal interference measurement, where the BFR response may be based on the beam failure being associated with the CLI.

Some examples of the method, apparatuses, and non-transitory computer-readable medium described herein may further include operations, features, means, or instructions for transmitting, to a second UE associated with the CLI, a set of intermediate CLI reports based on identifying the beam failure, identifying a set of beams satisfying a CLI threshold based on transmitting the set of intermediate CLI reports, and transmitting an indication of the set of beams satisfying the CLI threshold.

In some examples of the method, apparatuses, and non-transitory computer-readable medium described herein, the indication of the set of beams satisfying the CLI threshold may be transmitted to the network entity from the UE or transmitted to the network entity via the second UE.

A method for wireless communication at a network entity is described. The method may include receiving, from a first UE, a BFR request including an indication of whether a beam failure at a second UE is associated with a SI or a CLI, identifying one or more beam switching parameters based on the BFR request including the indication of whether the beam failure is associated with the SI or the CLI. and, and transmitting a BFR response indicating the one or more beam switching parameters.

An apparatus for wireless communication at a network entity is described. The apparatus may include a processor, memory coupled with the processor, and instructions stored in the memory. The instructions may be executable by the processor to cause the apparatus to receive, from a first UE, a BFR request including an indication of whether a beam failure at a second UE is associated with a SI or a CLI, identify one or more beam switching parameters based on the BFR request including the indication of whether the beam failure is associated with the SI or the CLI. and, and transmit a BFR response indicating the one or more beam switching parameters.

Another apparatus for wireless communication at a network entity is described. The apparatus may include means for receiving, from a first UE, a BFR request including an indication of whether a beam failure at a second UE is associated with a SI or a CLI, means for identifying one or more beam switching parameters based on the BFR request including the indication of whether the beam failure is associated with the SI or the CLI. and, and means for transmitting a BFR response indicating the one or more beam switching parameters.

A non-transitory computer-readable medium storing code for wireless communication at a network entity is described. The code may include instructions executable by a processor to receive, from a first UE, a BFR request including an indication of whether a beam failure at a second UE is associated with a SI or a CLI, identify one or more beam switching parameters based on the BFR request including the indication of whether the beam failure is associated with the SI or the CLI. and, and transmit a BFR response indicating the one or more beam switching parameters.

In some examples of the method, apparatuses, and non-transitory computer-readable medium described herein, transmitting the BFR response may include operations, features, means, or instructions for transmitting the BFR response indicating a change in uplink beam or downlink beam for the second UE based on whether the beam failure may be associated with the SI or the CLI.

In some examples of the method, apparatuses, and non-transitory computer-readable medium described herein, transmitting the BFR response may include operations, features, means, or instructions for transmitting the BFR response including a request for the second UE to switch from a FD mode to a HD mode.

In some examples of the method, apparatuses, and non-transitory computer-readable medium described herein, transmitting the BFR response may include operations, features, means, or instructions for transmitting the BFR response initiating a beam training procedure using at least one of reference signal received power measurement resources, SI measurement resources, and CLI measurement resources.

In some examples of the method, apparatuses, and non-transitory computer-readable medium described herein, transmitting the BFR response may include operations, features, means, or instructions for transmitting the BFR response including a command to reduce power associated with an uplink beam at the second UE, where the BFR response may be based on the beam failure being associated with the SI.

In some examples of the method, apparatuses, and non-transitory computer-readable medium described herein, transmitting the BFR response may include operations, features, means, or instructions for transmitting the BFR response including a command for the second UE to switch a first uplink beam to a second uplink beam, where the first uplink beam may have a greater signal interference with a downlink beam than the second uplink beam, and where the BFR response may be based on the beam failure being associated with the SI.

In some examples of the method, apparatuses, and non-transitory computer-readable medium described herein, transmitting the BFR response may include operations, features, means, or instructions for transmitting the BFR response including a trigger to initiate a process for uplink beam selection with signal interference measurement, where the BFR response may be based on the beam failure being associated with the CLI.

DETAILED DESCRIPTION

Figure 1:
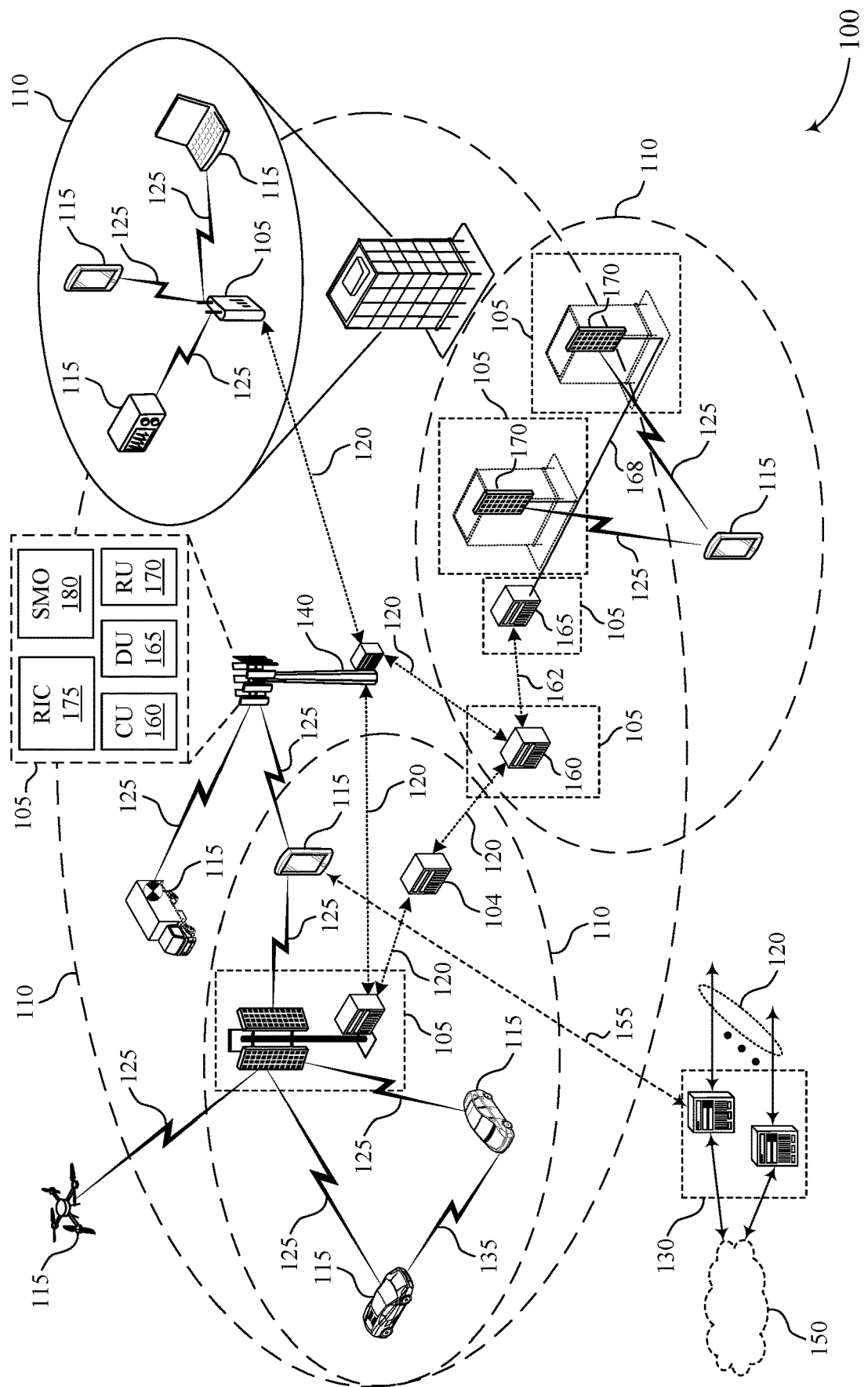
FIG. 1 illustrates an example of a wireless communications system that supports sidelink assisted indication of beam failure in accordance with one or more aspects of the present disclosure.

Wireless communications systems may support one or more wireless devices (e.g., user equipments (UEs), network entities) that are operating in different modes. For example, a UE may operate in a full duplex (FD) mode, a network entity may operate in the FD mode, or the network entity and the UE may operate in a flexible time domain duplex (TDD) mode. In some cases, wireless devices operating in multiple modes may experience beam failure due to different types of interference. For example, self-interference (SI) may occur when a signal leaks from a transmitter of a first device to a receiver of the first device. In other examples, cross-link interference (CLI) may occur when multiple network entities and corresponding UEs transmit and receive at the same time and in the same, overlapping, or non-overlapping frequency band. In some wireless communications systems, a beam failure recovery (BFR) process may be implemented to enable the network entity to switch from a failed downlink beam of the UE to a new working downlink beam of the UE. Additionally or alternatively, the one or more UEs may indicate to the network entity that the beam failure was due to SI or CLI. In some cases, the network entity may receive the indication of the type of beam failure and may switch the downlink beam or the uplink beam of the UE, or manage the interference through a joint optimization. In some examples, the UE indicates a BFR request (e.g., a BFR indication) via a physical random access channel (PRACH) to identify a candidate beam for the UE to use for transmission. However, in some wireless communications systems, random access channel (RACH) sequences or occasions may include mapping extra bits to separate the one or more RACH sequences or occasions to convey the beam failure reason and may increase latency and power consumption.

The described techniques relate to improved methods, systems, devices, or apparatuses that support sidelink assisted indication of beam failure. In some wireless communications systems, a sidelink channel may be used to transmit the BFR request from the UE when the beam failure has occurred to the network entity. In some examples, the BFR request includes an indication of whether the beam failure is due to CLI or SI. In some cases, the UE may determine a type of beam failure, such as an increase in SI or CLI or a decrease in a downlink reference signal received power (RSRP). In some examples, the UE may check the interference measurements against a type of threshold and may indicate that either SI or CLI caused the beam failure. In some examples, the UE may indicate that the beam failure was a result of SI or CLI, and the downlink RSRP may still support the communications in a half-duplex (HD) mode.

In some implementations, the wireless communications systems may support solutions that enable the UE to send the indication of SI or CLI caused beam failure to the network entity via sidelink or uplink RACH. In some examples, the UE may detect beam failure and the reasoning for beam failure. The UE may include the detection and the reason of beam failure in the BFR request via sidelink to another UE. In some cases, the other UE may transmit the BFR request uplink to the network entity, in which the network entity receives the request and identifies one or more beam switching parameters. The network entity may indicate a candidate beam for the UE to use in a BFR response transmitted to the UE via sidelink or downlink transmissions.

In some aspects, the UE may determine conditions for using sidelink and whether another UE in the wireless communication system may transmit the BFR request. In some examples, the BFR request may include a BFR media access control (MAC) control element (CE). In some examples, the UE may run through some conditions to determine if a sidelink relay UE may relay the BFR request. In some cases, the network entity may construct the BFR response (e.g., a BFR MAC-CE response) for multiple types of beam failure and may determine the UE response to each type of beam failure. Additionally or alternatively, the BFR response may include responses to beam failure due to SI or CLI. In some cases, the BFR response may include the behavior for each type of response at the UE and where the network entity may transmit the BFR response.

Particular aspects of the subject matter described herein may be implemented to realize one or more potential advantages. The described techniques may provide for reduced latency as sidelink transmission speeds may exceed speeds of a BFR RACH procedure. In some cases, the RACH latency (e.g., a RACH configuration periodicity) is large (e.g., 40 milliseconds (ms)), and sidelink transmissions occur more frequently. In addition, the wireless communication system may create alternative paths for BFR information. In some cases, the downlink and uplink beams may be blocked and transmitting via sidelink may provide an alternative path from UEs to network entities. In some aspects, the wireless communication system may transmit less frequently and reduce power overhead via sidelink compared to using PRACH procedures. In some cases, the sidelink used to relay BFR information may be currently set up for multi-link connectivity purposes, in which using the same sidelink may reduce latency and signaling overhead. As such, the wireless communication system may use sidelink for less contention of resources and to improve the BFR process.

Aspects of the disclosure are initially described in the context of wireless communications systems and process flows. Aspects of the disclosure are further illustrated by and described with reference to apparatus diagrams, system diagrams, and flowcharts that relate to sidelink assisted indication of beam failure.

FIG. 1 illustrates an example of a wireless communications system 100 that supports sidelink assisted indication of beam failure in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support sidelink assisted indication of beam failure as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems 100, multiple UEs 115 and network entities 105 may operate in different modes. For example, a UE 115 may operate in a FD mode, a network entity 105 may operate in the FD mode, or the network entity 105 and the UE 115 may operate in a TDD mode. In some cases, wireless devices operating in multiple modes may experience beam failure due to different types of interference. For example, SI may occur when a signal leaks from a transmitter of the UE 115 to a receiver of the UE 115. In other examples, CLI may occur when multiple network entities 105 and corresponding UEs 115 transmit and receive in the same frequency band. In some wireless communications systems 100, a BFR process may be implemented to enable the network entity 105 to switch from the failed uplink beam of the UE 115 to the downlink beam of the UE 115. Additionally or alternatively, the one or more UEs 115 may indicate to the network entity 105 that the beam failure was due to SI or CLI. In some cases, the network entity 105 may receive the indication of the type of beam failure and may switch the downlink beam or the uplink beam of the UE 115, or manage the interference jointly. In some examples, the UE 115 indicates a BFR request via a PRACH to identify a candidate beam for the UE 115 to use for transmission. However, in some wireless communications systems, RACH sequences or occasions may include mapping extra bits to separate the one or more RACH sequences or occasions and may increase latency and power consumption.

In some implementations, the wireless communications system 100 may support a solution that enables the UE 115 to send the indication of SI or CLI caused beam failure to the network entity 105 via sidelink or uplink RACH. In some examples, the UE 115 may detect beam failure and the reasoning for beam failure. The UE 115 may include the detection and the reason for beam failure in the BFR request via sidelink to another UE 115. In some cases, the other UE 115 may transmit the BFR request uplink to the network entity 105, in which the network entity 105 receives the request and identifies one or more beam switching parameters. The network entity 105 may indicate a candidate beam for the UE 115 to use in a BFR response transmitted to the UE 115 via sidelink or downlink transmissions.

As described herein, the UE 115 may determine conditions for sidelink and whether another UE 115 in the wireless communication system 100 may transmit the BFR request. In some cases, the BFR request may include a BFR MAC-CE. In some examples, the UE 115 may run through some conditions to determine if a sidelink relay UE 115 may relay a BFR request. In some cases, the network entity 105 may construct the BFR response for multiple types of beam failure and may determine how the UE 115 response to each type of beam failure. Additionally or alternatively, the BFR response may include responses to beam failure due to SI or CLI. In some cases, the BFR response may include the behavior for each type of response at the UE 115 and where the network entity 105 may transmit the BFR response.

Figure 2:
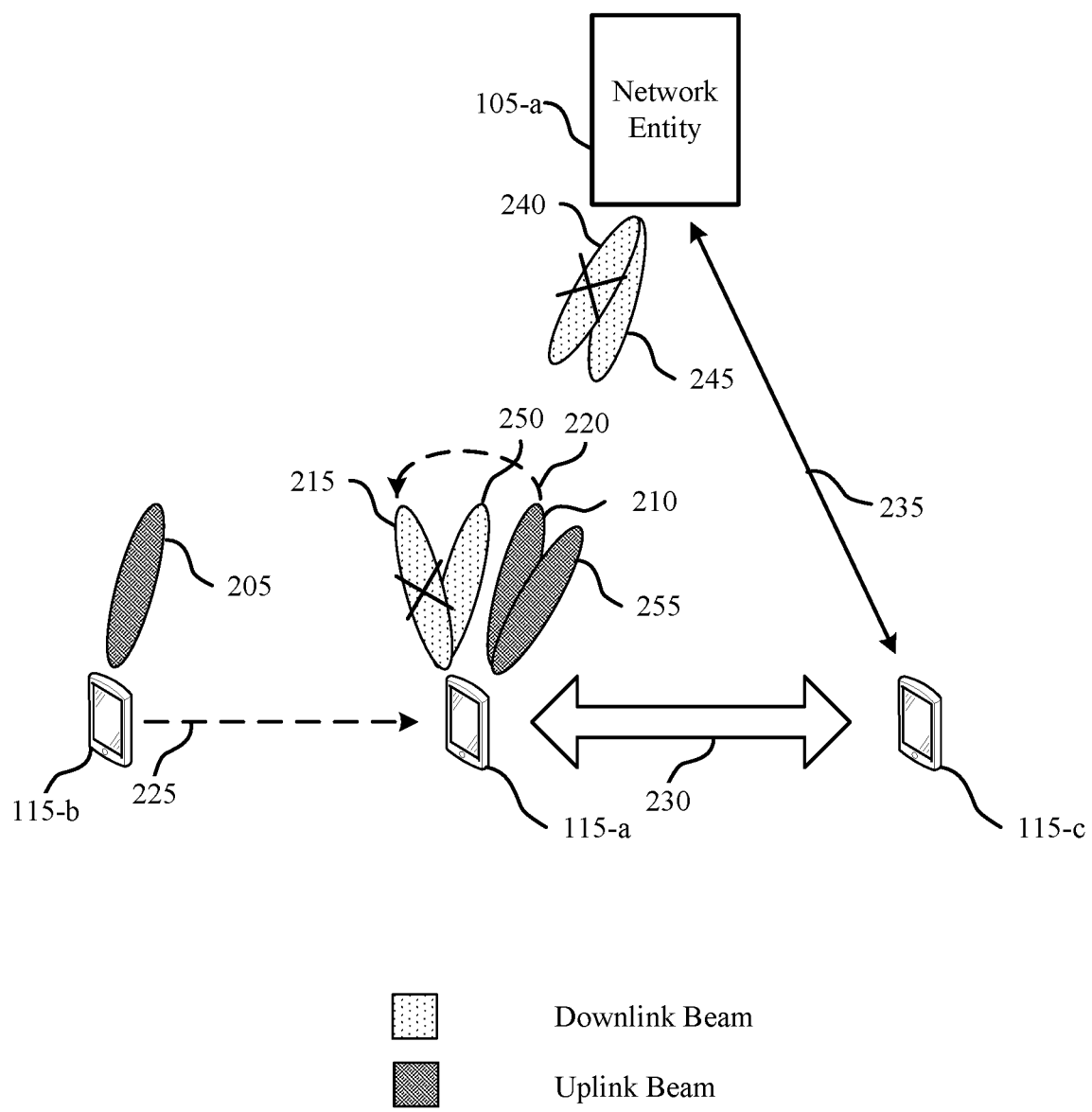
FIG. 2 illustrates an example of a wireless communications system that supports sidelink assisted indication of beam failure in accordance with one or more aspects of the present disclosure.

FIG. 2 illustrates an example of a wireless communications system 200 that supports sidelink assisted indication of beam failure in accordance with one or more aspects of the present disclosure. In some examples, the wireless communications system 200 may implement aspects of the wireless communications system 100. The wireless communications system 200 may include a UE 115-*a*, a UE 115-*b*, and a UE 115-*c*, and a network entity 105-*a*, which may be examples of corresponding devices as described herein, including with reference to FIG. 1.

In some implementations, the wireless communication system 200 may support wireless devices, such as the UE 115-*a*, the UE 115-*b*, and the UE 115-*c*, and the network entity 105-*a*, operating in different modes. For example, one or more UEs 115 may operate in an FD mode to enable the UEs 115 to simultaneously transmit and receive using corresponding transmitting and receiving analog beams. In other cases, the network entity 105-*a* may operate in the FD mode that enables the network entity 105-*a* to simultaneously transmit and receive using the transmitting and receiving analog beams. In some examples, the network entity 105-*a* and the UEs 115 may operate in a TDD mode that enables one or more HD network entities 105-*a* in neighboring cells to adopt to different traffic directions at the same time (e.g., downlink in one cell and uplink in another cell).

In some aspects, wireless devices operating in multiple modes may experience beam failure due to different types of interference. For example, the network entity 105-*a* and the UE 115—may operate in the FD mode while using one or more beams to communicate. In some cases, beam failure may occur when the network entity 105-*a* is unable to transmit a message over a downlink beam 215 to the UE 115-*a* due to a possible blockage in the path or if the UE 115-*a* is unable to receive a message from the network entity 105-*a* due to a possible blockage. In other examples, the UE 115-*a* that operates in multiple modes may suffer from SI or CLI in some beam failure scenarios. For example, SI may occur when a signal leaks from a transmitter from the UE 115-*a* to a receiver of the UE 115-*a*. That is, the UE 115-*a* may transmit a message via an uplink beam 210 that may leak and cause an interference 220 to a reception via the downlink beam 215 and alternative communication beams may be desired. In other examples, CLI may occur when other wireless devices from neighboring cells transmit and receive at the same time in the same, overlapping or adjacent frequency band. For example, the nearby UE 115-*b* may transmit a communication via an uplink beam 205 to the network entity 105-*a*, which may interfere with a reception via the downlink beam 215 at the UE 115-*a*. In other examples, the UE 115-*b* may transmit a communication via the uplink beam 205 to a neighboring network entity, which may interfere with a reception via the downlink beam 215 at the UE 115-*a*. Knowing that beam failure was caused by increased SI or CLI can help in enhanced BFR.

According to one or more aspects depicted herein, the wireless communications system 200 may implement a BFR process to enable the network entity 105-*a* to switch to other possible beams. For example, the network entity 105-*a* may recognize that the uplink beam 210 may be interfering with the downlink beam 215 and may switch the downlink beam 215 to a possible downlink beam 250 or the uplink beam 210 to a possible uplink beam 255. Additionally or alternatively, the wireless communications system 200 may indicate to the network entity 105-*a* that the beam failure was due to SI or CLI. In some cases, the indication of the type of beam failure may allow the network entity 105-*a* to switch the downlink beam 215 or the uplink beam 210 at the UE 115-*a*, or manage the interference jointly.

In some examples, SI may cause the beam failure at the UE 115-*a*. In some cases, the downlink beam 215 at the UE 115-*a* may fail and the UE 115-*a* may initiate the BFR process by transmitting a BFR request to the network entity 105-*a*. In some examples, the BFR request may include a BFR MAC-CE. In some examples, the UE 115-*a* may transmit the BFR request to the network entity 105-*a* via an existing uplink allocation. In some cases, the UE 115-*a* may have an uplink grant (e.g., a dynamic grant, a configured grant) that may be allocated to send the BFR request via the uplink grant. The UE 115-*a* may receive a response from the network entity 105-*a* via DCI on a new candidate beam. In some cases, SI may impact the DCI that transmits the response. In such instances, the DCI that transmits the BFR response is formatted for HD or BFR search space (SS) and may have no uplink transmission capabilities. In some examples, the UE 115-*a* may transmit the BFR request and the network entity 105-*a* may miss the uplink transmission. In some cases, the network entity 105-*a* may attempt to schedule a retransmission via a Uu (e.g., access) link SS and may fail (e.g., deadlock) due to SI. In such cases, the UE 115-*a* may wait for some time (e.g., X msec after transmission of BFR MAC-CE) to receive a DCI scheduling uplink retransmission and the BFR response and may consider another fallback option for the BFR request transmission when the time expires and a response is not received. In some examples, the UE 115-*a* may transmit the BFR request via an existing uplink allocation without using extra uplink or sidelink grants. In some cases, it may not be realistic to assume that uplink grant was present when downlink has failed. In such cases, the UE 115-*a* may switch to HD mode when the uplink traffic is not urgent.

In other examples, the UE 115-*a* may transmit an uplink special scheduling request (SR) to the network entity 105-*a* to request resources for transmitting the BFR request. In some cases, the network entity 105-*a* may respond to the SR by providing an uplink grant. In some cases, the network entity 105-*a* may provide the uplink grant via an Uu link in HD mode to avoid SI, via a sidelink, or via a non-failed downlink (e.g., multiple transmission reception point (mTRP)). In some cases, the UE 115-*a* may use the provided uplink grant instead of using sidelink resources to send the BFR request. In this case, the latency may be larger than transmitting a BFR via an existing uplink allocation and the response may be sent via sidelink (with setup) or via Uu link when switched to HD mode (which may disrupt any ongoing urgent uplink traffic).

In some implementations, the UE 115-*a* may transmit a PRACH (e.g., a message 1) on a new candidate FD downlink beam. In some cases, the FD downlink beam passes a signal to interference plus noise ratio (SINR) threshold. In some examples, in both a contention based random access (CBRA) and a contention free random access (CFRA) procedures, the UE 115-*a* may receive an uplink allocation (e.g., a message 2) to transmit the BFR request. The UE 115-*a* may transmit the BFR request (e.g., a message 3) to the network entity 105-*a*. In some cases, the UE 115-*a* may determine that a candidate FD downlink beam is unavailable and may send RACH on a downlink beam (e.g., a current downlink beam) in HD mode that passes an RSRP threshold. In such examples, the UE 115-*a* may transmit the RACH on the downlink beam with different modes, such as a FD RACH and a HD RACH so the network entity 105-*a* may differentiate between the two types of RACH on the same downlink beam. In some cases, the UE 115-*a* may transmit a different RACH occasion (RO) or RACH sequence for FD or HD modes. In other cases, the UE 115-*a* may transmit the same RO and RACH sequence, in which the FD and HD modes are indicated in the BFR MAC-CE. In such cases, if the UE 115-*a* is to use the same RO and RACH sequence, the uplink allocation message (e.g., a message 2) may be received in HD mode to avoid SI. In some examples, the UE 115-a may transmit the BFR request via RACH to reduce the specification changes for the wireless communication system 200. In some cases, the network entity 105-a and the UE 115-a may reconsider latency when sending a RACH message.

In some implementations, the UE 115-a may transmit the BFR indication via a sidelink relay UE 115-c. In this example, the sidelink relay UE 115-c may use a sidelink channel 230 to connect to the UE 115-a. In some cases, the UE 115-a may wait for some time to receive a BFR response and may resend the BFR request via the sidelink channel 230 if a BFR response is not received. In some examples, the UE 115-a may use a sidelink assisted BFR request and response indication to reduce latency compared to techniques like RACH based indication of beam failure and other RACH BFR processes.

In some implementations, the UE 115-a may combine RACH and sidelink methods to indicate the BFR request to the network entity 105-a to increase robustness and reduce latency. In some examples, using a combination of RACH and sidelink methods may be useful when the uplink has ultra-reliable low latency communication (URLLC) traffic and may allow sidelink and RACH transmissions to stay in FD mode without switching to HD mode (e.g., the BFR request is transmitted via RACH and the response is received via sidelink).

In other aspects, the UE 115-a may transmit the BFR request during a HD uplink slot. In some cases, the UE 115-a may be expected to be configured with a mix of FD and HD slots (e.g., not all slots are FD), such that the BFR request may be transmitted in an upcoming uplink HD slot. In other aspects, the BFR response from the network entity 105-a may be transmitted on a HD downlink slot. In some cases, the decision for which slots to use may be based on the availability or an opportunity to send the BFR request with uplink, RACH, HD uplink, or sidelink.

As described herein, the UE 115-a may transmit the BFR request via the sidelink channel 230 to the sidelink relay UE 115-c when the beam failure has occurred. In some examples, the BFR request may include an indication of whether the beam failure is due to CLI or SI. In some cases, the UE 115-a may determine the type of beam failure based on an increase in SI or CLI or a decrease in a downlink reference signal received power (RSRP). In some examples, the UE 115-a may detect the beam failure and may check the interference values with a threshold to determine the type of beam failure. The threshold may denote the tolerable level of a specific type of interference at the receiver. For example, the UE 115-a may check whether the SINR satisfies the threshold for the downlink RSRP, SI, and CLI measurements and may measure each measurement to one or more maximum thresholds. In some cases, the maximum SI threshold may be defined as a certain decibel (dB) down (e.g., −80 dB) from the uplink transmitting power or downlink receiving power of the UE 115-a or a certain dB above a noise floor level. In some cases, the maximum CLI threshold may be defined as a certain decibel (dB) down (e.g., −80 dB) from a reference power or downlink receiving power of the UE 115-a or a certain dB above a noise floor level.

In some implementations, the UE 115-a may calculate the SINR using the downlink RSRP divided by the interference (e.g., downlink RSRP/(SI+CLI+noise)) may be used to indicate beam failure when the SINR drops below an outage threshold. In some cases, the SINR is less than the outage threshold value and the UE 115-a may enable a set of checks for each interference type. In some cases, the UE 115-a may determine that the downlink RSRP divided by the maximum SI threshold plus the maximum CLI threshold plus the noise (e.g., downlink RSRP/(max_SI threshold+max_CLI threshold+N)<outage threshold) may be less than the outage threshold and may be declared as a downlink RSRP based beam failure. In other cases, the UE 115-a may not determine a downlink RSRP based beam failure but that the SI measurement may be greater than the maximum SI threshold and the CLI measurement may be greater than the maximum CLI threshold (e.g., SI>max_SI threshold & CLI>max_CLI threshold) and may be declared as a SI and CLI based beam failure. Additionally or alternatively, the UE 115-a may determine that the SI measurement may be greater than the maximum SI threshold and the CLI measurement may be less than the maximum CLI threshold (e.g., SI>max_SI threshold & CLI<max_CLI threshold) and may be declared as a SI based beam failure. In other examples, the UE 115-a may determine that the SI measurement is less than the maximum SI threshold and the CLI measurement may be greater than the maximum CLI threshold (e.g., SI<max_SI threshold & CLI>max_CLI threshold) and may be declared as a CLI based beam failure. In some examples, the SI and CLI based beam failure, the SI based beam failure, and the CLI based beam failure may indicate new modes of beam failure for the network entity 105-a. In some examples, the UE 115-a may determine that the beam failure was a result of SI or CLI, and the downlink RSRP may support the communications in the HD mode.

In some implementations, the UE 115-a may send the BFR request to the network entity 105-a via the sidelink channel 230. In some cases, the UE 115-a may detect the beam failure due to SI or CLI and may initiate the BFR request to the network entity 105-a. In some examples, the UE 115-a may construct the BFR request which may include the BFR MAC-CE, information about the SI or CLI causing the beam failure, and other routing information. The UE 115-a may transmit the BFR request to the network entity 105-a via an appropriate path (e.g., a link) chose based on some conditions (e.g., priority rules). In some cases, the path may include the sidelink channel 230 that allows the sidelink relay UE 115-c to receive the BFR request and an Uu link 235 that transmits the BFR request to the network entity 105-a. In some cases, the UE 115-a may monitor for the BFR response from the network entity 105-a using specific resources and or links based on some set of rules. The UE 115-a may receive the BFR response from the network entity 105-a and switch beams for transmission or undergo further beam management.

In some examples, the UE 115-a may construct the BFR request which includes information about the SI or CLI caused beam failure and additional routing information. In some cases, the UE 115-a may request new configured measurement resources to monitor SI and CLI for continuous SI or CLI measurement. In some instances, the network entity 105-a may configure the resources within beam failure detection reference signals (BFD-RSs) to obtain periodic RSRP, SI, and CLI measurements. For example, the uplink RS may be configured as a SI interference measurement resource (IMR) (e.g., a demodulated reference signal (DMRS), a sounding reference signal (SRS)) for the UE 115-a to measure SI. In some cases, the resources may be configured to measure SI due to different uplink transmission beams. In other examples, or more SRS-RSRP or CLI received signal strength indicator (RSSI) resources may be configured as a CLI-IMR to measure CLI at the UE 115-a. In some examples, the network entity 105-a may configure multiple CLI-IMR to measure CLI due to different neighbor UEs. Additionally or alternatively, the network entity 105-*a* may configure the resources to measure a single CLI-IMR and may measure a total CLI from multiple neighbor UEs. In some instances, the CLI may be measured using a periodic CLI-IMR, which may be irrespective to the interfering UEs transmission schedule, and may avoid a degraded CLI.

In some aspects, the UE 115-*a* may construct the contents of the BFR request to include multiple types of information that may be beneficial to the network entity 105-*a*. In some examples, the BFR request may include an SI or CLI indication. In some cases, the MAC layer may use one or more bits to indicate to the network entity 105-*a* via the sidelink relay UE 115-*c* that the beam failure was caused by an increased SI, CLI, or both interferences. In some cases, the UE 115-*a* may transmit a control signaling that includes the beam failure indication and the corresponding reason for beam failures based on the measurements associated with the physical layer. In some cases, the UE 115-*a* may transmit a corresponding identifier for the SI that caused the beam failure, the identifier for the CLI that caused the beam failure, an uplink beam identifier that caused the SI, an uplink beam identifier that caused the CLI, a TRP identifier associated with the beam failure, a UE identifier, a cell identifier, an indication of a set of preferred beams for the preferred beams for uplink and/or downlink transmissions, or a combination of the listed identifiers. In some examples, the UE 115-*a* may measure the downlink RSRP, background interference (e.g., noise), SI and CLI at each measurement occasion and may determine beam failure indications at the physical layer of the UE 115-*a* are met and pass this information on to the MAC layer. In some cases, the reasoning for beam failure may include a decreased downlink RSRP, an increased SI, or an increased CLI measurement. Additionally or alternatively, the physical layer may pass raw measurements to the MAC layer and may determine the reason for beam failure. In some examples, the UE 115-*a* may determine that all of the control beams across all transmission reception points (TRPs) have failed and may indicate total beam failure. In other cases, the UE 115-*a* may determine that all control beams on a single TRP have failed and may indicate a per TRP beam failure.

In other aspects, the UE 115-*a* may construct the contents of the BFR request to include information about interfering beams. In some cases, the UE 115-*a* may report the identification (ID) for the SI-IMR or the CLI-IMR that causes the beam failure for the network entity 105-*a* and may identify the interfering uplink beam or a neighboring UE beam. In some examples, the network entity 105-*a* may identify the uplink beam or the neighboring UE beam and undergo corrective procedures. In some cases, the UE 115-*a* may report the SI-IMR when the UE 115-*a* has multiple uplink beams (e.g., mTRP uplink beams). Additionally or alternatively, the UE 115-*a* may report uplink beam identification that causes SI when SI-IMR is unconfigured (e.g., SI is measured on the data which may use different uplink transmission beams). In some cases, the UE 115-*a* may report the failed TRP ID for each TRP beam failure, in which a single beam has failed among multiple downlink beams. In other cases, the UE 115-*a* may report the failed CLI-IMR ID for each interfering CLI beam. In some cases, the CLI-IMR may be unconfigured and the UE 115-*a* may reuse the RSRP and SI measurement occasions (MOs) to measure the RSSI of the CLI and report the total CLI level to the network entity 105-*a*. In some instances, the network entity 105-*a* may identify that the beam failure is caused by CLI and the interfering UE may be unaware of the CLI. Additionally or alternatively, if the CLI-IMR is unconfigured, the UE 115-*a* may report the aggregate CLI in addition to the CLI detections to assist the network entity 105-*a* to determine the one or more interfering UEs. In other examples, when the CLI-IMR is unconfigured, the UE 115-*a* may report some characteristics of the observed CLI that assists the network entity 105-*a* in finding the interfering UE (e.g., resource block (RB) range facing increased CLI, detected root of the DMRS/SRS sequence, detected MCS, or the like).

In other implementations, the UE 115-*a* may construct the contents of the BFR request to include the value of increased SI or CLI. In some cases, the values may be in absolute units of decibel-milliwatts (dBm), relative units of dB, or quantized units (e.g., low, medium, high), or the like. In some cases, the UE 115-*a* may transmit the values of increased SI or CLI to assist the network entity 105-*a* in adjusting uplink power and reducing interference.

In some examples, the UE 115-*a* may construct the contents of the BFR request to include information for forwarding to the network entity 105-*a* and UE identification. In some cases, the UE 115-*a* may pass a cell ID (e.g., a physical cell ID (PCI)), a serving cell ID, an UE ID (e.g., a cell radio network temporary identifier (C-RNTI)) in the BFR MAC-CE). In some examples, the UE 115-*a* may pass the cell ID to allow the sidelink relay UE 115-*c* and the wireless communication system 200 to pass the BFR request to the appropriate (e.g., destination) network entity. In some cases, the cell ID may not be transmitted for the sidelink relay UE 115-*c* connected to the same network entity or cell as the UE 115-*a* transmitting the BFR request. In other cases, the sidelink relay UE 115-*c* may pass the BFR request to its own network entity 105-*a*, and the network entity 105-*a* will forward the BFR request to the appropriate network entity through a core network based on the cell ID. In some aspects, the UE 115-*a* may skip reporting the ID of the UE 115-*a* and/or the cell ID of the UE 115-*a*, if the UE 115-*a* indicates the BFR request via the uplink beam 210.

In some examples, the sidelink relay UE 115-*c* may receive the BFR request via sidelink channel 230 and may automatically trigger forwarding the BFR request to the network entity 105-*a*. In some cases, the first forwarding network entity (e.g., the network entity 105-*a* of the sidelink relay UE 115-*c*) may append the ID of the first forwarding network entity to the BFR request when forwarding the request to the appropriate network entity to track the sidelink path for of the BFR response. In other examples, the network entity 105-*a* of the sidelink relay UE 115-*c* may identify that the UE 115-*a* is reachable via sidelink relay UE 115-*c* when sending a response back to the correct UE 115-*a*. In some cases, the appropriate network entity may use a routing table to route the response to the first forwarding network entity 105-*a* which may then forward the response to the sidelink relay UE 115-*c* and on to the UE 115-*a*. In some examples, the design for a relayed BFR MAC-CE request and response may reuse the design similar to a buffer status report (BSR) MAC-CE forwarding that is utilized in multi-hop networks.

In some aspects, the UE 115-*a* may construct the contents of the request to indicate preferred new beams for downlink, uplink, or both in the BFR request. In some cases, the indication of the new beams may depend on the intelligence of measurement capabilities of the UE 115-*a*. In some examples, a new candidate downlink beam may be selected based on SINR measurement and a network configured SINR threshold. In some cases, the UE 115-*a* may compare different (e.g., measured) metrics with the new beam selection threshold (e.g., RSSI for downlink beam blockage, SINR for SI or CLI based BFR) with regards to reasoning for beam failure. In some cases, the UE 115-a may choose one or more possible downlink beams that may satisfy the network configured SINR threshold (e.g., a measurement threshold, greater than the SINR threshold. In some examples, the one or more downlink beams may be specified as one or more preferred beams. Additionally or alternatively, the UE 115-a may choose the one or more downlink beams that maximize a measurement metric (e.g., the SINR) to select the one or more preferred beams. In some examples, the measurement of SINR for the new candidate downlink beam may be measured using ongoing downlink synchronization signal blocks (SSBs), channel state information (CSI) RSs, DMRSs, uplink SRSs or DMRSs for SI measurement that may be BFR triggered, and uplink SRSs or DMRSs from other UEs for CLI measurement. In some cases, the new candidate uplink beam may be identified by measuring on a new candidate downlink beam and assuming channel reciprocity. In other cases, the new candidate uplink beam may be identified by an uplink transmission from the UE 115-a and measurements of different metrics at the network entity 105-a. Additionally or alternatively, the UE 115-a may identify the candidate downlink and uplink beams based on the UE 115-a storing past measurements and stored fallback pairs.

In some aspects, the UE 115-a may construct the contents of the BFR request to indicate preferred new beams for downlink, uplink, or both in the BFR request in multiple methods. For example, if a new candidate FD downlink beam is found, the UE 115-a may transmit the new beam ID in the BFR request. In other examples, the UE 115-a may transmit a beam with a usable RSRP that is recoverable in FD mode by reducing the uplink transmit power and indicating the beam ID (e.g., if beam0 has RSRP>30 dB but the SINR is limited to 20 dB due to SI while the required SINR=23 dB, and may indicate beam0 ID with an UL Tx power reduction of 3 dB) when a FD downlink beam is unavailable. In other cases, the UE 115-a may indicate a downlink beam ID with a good RSRP while ignoring SINR due to a lack of FD downlink beams that satisfy the FD constraints. In such cases, the UE 115-a may expect to switch to HD mode for a temporary duration. In some cases, the UE 115-a may reduce power or stop uplink transmission within the BFR search space until a BFR response from the network entity 105-a is received. In some cases, the UE 115-a may recommend to the network entity 105-a to reduce the uplink transmission power (e.g., by θ dB) in order to come out of beam failure.

In some examples, the UE 115-a may construct the contents of the BFR request to indicate a list of available sidelink UEs in the occasion when the BFR request is transmitted and may be received via sidelink. In some cases, the UE 115-a may determine that the uplink and sidelink communication is working and may transmit the request via uplink and may receive the response from the network entity 105-a via sidelink channel 230. In such cases, the UE 115-a may include the ID of one or more nearby (e.g., connected) sidelink relay UEs in the BFR request. In some examples, the format of the ID for the sidelink relay UE ID may include any UE ID, C-RNTI, or another network entity 105-a provided ID. In some cases, the network entity 105-a may choose one of the sidelink relay UEs from the list to send the response in addition to sending the response via the downlink beam 215. The UE 115-a may monitor one or more of the sidelink relay UEs for the response from the network entity 105-a.

In some cases, the UE 115-a may construct the contents of the BFR request to monitor for the response from the network entity 105-a. In some examples, the response from the network entity 105-a may include a BFR response to the UE 115-a. In some cases the UE 115-a may recommend to the network entity 105-a to transmit the BFR response via sidelink or Uu link. In some examples, the UE 115-a may be preconfigured to monitor the Uu link, the sidelink, or both for the BFR response from the network entity 105-a depending on link latencies, priority of the uplink or downlink traffic, or based on the preference requested by the UE 115-a. In some examples, the UE 115-a may monitor for the BFR response from the network entity 105-a on the Uu link in multiple methods. In some cases, when a new candidate FD downlink beam is indicated, the UE 115-a may monitor for a DCI on the Uu link on the new candidate FD downlink beam. In other cases, the UE 115-a may monitor for DCI on the Uu link on the indicated FD downlink beam and may reduce the uplink transmit power by the suggested amount (e.g., by θ dB). In other examples, the UE 115-a may monitor for DCI on the Uu link on the indicated HD downlink beam and may stop uplink transmission (e.g., stop the uplink transmission in the BFR search space). In some aspects, the UE 115-a may monitor for the BFR response via sidelink if configured to do so. In some cases, the sidelink relay UE 115-c may transmit the BFR response via the sidelink path that communicated the BFR request.

According to one or more aspects of the present disclosure, the UE 115-a may determine the candidate sidelink relay UE to use based on finding (e.g., discovering) a set of available sidelink relay UEs. In some examples, the network entity 105-a may either pre-configure the UE 115-a with a list of available sidelink relay UEs for relaying a BFR request, which includes the BFR MAC-CE, or the UE 115-a may use the sidelink finding mode to find an available sidelink relay UE. In both cases, the UE 115-a may inquire among the available sidelink UEs to determine which of the sidelink relays have an active uplink and may select one of those UEs for sidelink relaying. In some examples, the UE 115-a may determine the reliability of the sidelink relay UE through broadcasting or multicasting the BFR request on the sidelink. The UE 115-a may expect multiple UEs to receive the request and forward the request to additional network entities to prove reliability. In some cases, the UE 115-a may determine if the existing sidelink relay UE 115-c may be a candidate for sidelink transmissions. In some examples, the sidelink relay UEs that may be used for transmitting the BFR request may meet minimum conditions, as described herein.

In some aspects, the UE 115-a may determine if sidelink transmission of the BFR request is preferable over other modes. For example, the UE 115-a may decide to use sidelink compared to uplink, SR, RACH, and a HD uplink occasion for the BFR request based on latency, priority of uplink and downlink traffic, and link quality. In some examples, the time duration for BFR indication varies for each method. For example, the latency via sidelink may include the UE 115-a transmitting via sidelink to the sidelink relay UE 115-c and the uplink transmission to the network entity 105-a. In some examples, the latency via SR may include the latency to send the SR, the latency to receive a DCI in response to the SR with a future uplink allocation, and the latency to transmit the BFR request on that uplink allocation. In other examples, the latency via uplink may include the uplink transmission from the UE 115-a to the network entity 105-a. In other cases, the latency via RACH may include the latency to send or receive message 1, the message 2, the message 3, and the message 4. In other examples, the latency via a HD uplink occasion may include the time to the next available HD uplink occasion or the periodicity of a configured HD uplink grant. As such, the comparison of latency of BFR indication across different modes may suggest that when the uplink beam 210 is working and an uplink allocation is available, the UE 115-*a* may use the existing uplink allocation to transmit the BFR request. However, in other cases such as if the uplink is working but an allocation is not available or if no uplink allocation is available, the UE 115-*a* may decide the BFR request method among the different available indication methods based on their latency of indication, link quality, and any effects on ongoing uplink and downlink traffic (e.g., the UE 115-*a* may have to switch to HD mode while waiting for network entities to respond, disrupting priority uplink traffic).

In some examples, the UE 115-*a* may determine if sidelink transmission of the BFR request is preferable over RACH or uplink when the uplink of the UE 115-*a* is unavailable. In some cases, the UE 115-*a* may use sidelink when the RACH latency is higher, the RACH fails one or more times, a new PRACH beam is not available, or the RACH process uses more power or resources than the sidelink transmission. In other examples, in the case where the uplink is working and allocated for the UE 115-*a*, the uplink may be preferred over the other transmission modes. In some cases, sidelink may be additionally implemented to provide robustness to the BFR request or a new path to send the BFR response. Additionally or alternatively, the UE 115-*a* may use sidelink if the sidelink quality exceeds the uplink quality. In some examples, rules for using the sidelink relay UE instead of RACH to send the BFR request is compared when the uplink is unavailable. In some instances, the UE 115-*a* may utilize the sidelink relay UE 115-*c* if the sidelink relay UE 115-*c* has passed certain conditions and may be a candidate sidelink relay UE. In some examples, the UE 115-*a* may use sidelink over RACH after beam failure detection if the latency or periodicity of the next available sidelink assisted BFR indication is smaller than the latency or periodicity of the next available RACH occasion. In some cases, simply an indication latency (e.g., latency to send the BFR request from the UE 115-*a* to the network entity 105-*a* and not considering the latency to receive the response) may be compared between the RACH and sidelink assisted BFR and may determine which method is used to send the BFR request. In some instances, the response latency (the latency to send the BFR response from the network entity 105-*a* to the UE 115-*a*) of the sidelink assisted BFR may be smaller than the response latency of RACH assisted BFR, and the UE 115-*a* may monitor the sidelink for a BFR response. In other cases, the RACH based BFR process may have failed a number (e.g., X, where X is configurable by a network or fixed by a standard) of times. In some examples, the RACH failure may occur multiple times because the UE 115-*a* is unable to decode the message 2 DCI, as the chosen downlink beam suffers from a high amount of CLI. In such instances where the UE 115-*a* fails RACH a number of times, the UE 115-*a* may indicate the BFR via sidelink and wait for the BFR response with instructions on beam recovery (e.g., switch to a different cell).

In some examples, the UE 115-*a* may use sidelink over RACH after beam failure detection when a candidate downlink beam is unavailable (e.g., no SSB beam has a SINR>a threshold but at least one SSB beam has RSRP>a threshold) and hence the PRACH occasion cannot be determined. In such cases, sidelink may be used to transmit the BFR request and monitor for the BFR response. In other examples, the UE 115-*a* may use sidelink over RACH after beam failure detection because RACH uses more time, frequency, and power resources compared to a sidelink transmission. In some cases, the UE 115-*a* may look to save power resources due to maximum permissible exposure (MPE), low battery, or the UE 115-*a* may be a low power UE (e.g., an industrial internet of things (IIoT)). In some examples, the PRACH sequence may span 6 to 12 symbols and up to 144 resource elements (REs) in FR2 and may exceed the resources needed for BFR request. In such cases, sending BFR request over sidelink may use lesser time or frequency resources. Additionally or alternatively, the UE 115-*a* may use sidelink over RACH after beam failure detection due to the increase in robustness or reliability for BFR. In some examples, the UE 115-*a* may transmit critical data (e.g., video frames and may prefer to use both links for BFR to quickly reach the network entity 105-*a*) that the RACH process may not provide. In some cases, the UE 115-*a* may choose to use sidelink when RACH chooses a new candidate downlink beam with a low SINR (e.g., due to CLI) which is above a SINR threshold. In such cases, sidelink may be additionally used to transmit the BFR request and indicate the availability of an alternative path (via sidelink) to receive the BFR response. In some cases, if UE 115-*a* is connected to a good sidelink relay UE 115-*c*, then sidelink may be considered available for BFR purposes. In other cases, if the UE 115-*a* is able to find a candidate sidelink relay UE within a short time duration (e.g., Y msec, where Y is configurable by a network or fixed by a standard) through a discovery mode or an existing future sidelink grant from the network entity 105-*a*, and sidelink may be considered available for BFR purposes.

In some aspects, the UE 115-*a* may determine that the uplink communication is working and allocation for the uplink is present, and may use sidelink, uplink, or both for sending the BFR request. In some examples, the UE 115-*a* may determine if the uplink is working by using the periodic spatial RS or downlink pathloss RS and if the uplink is working and allocated, the BFR request may be transmitted on the uplink. In some cases, the UE 115-*a* may use the sidelink relayed BFR request in addition to the sending the request via uplink to increase robustness. In some examples, the UE 115-*a* may transmit an indication (e.g., a minimal indication) via sidelink to indicate to the network entity 105-*a* that an additional sidelink path exists for receiving the BFR response. In some examples, the network entity 105-*a* may use the sidelink path to send additional commands besides the DCI on the Uu link when a switch to FD mode is possible (e.g., network entity 105-*a* may provision IMR for SI or CLI measurement with an uplink beam sweep via the sidelink while signaling a switch to a new candidate downlink beam via the Uu link). In other examples, the network entity 105-*a* may use the sidelink path to configure SI or CLI measurement resources to recover the FD mode when the UE 115-*a* indicates only HD capable beams in the BFR request. In some cases, the network entity 105-*a* may use the sidelink path to continue urgent downlink data transmissions via sidelink relaying, which may be useful in extended reality (XR) gaming scenarios. Additionally or alternatively, the UE 115-*a* may transmit the BFR via sidelink when the estimated uplink link quality is below a threshold or is lower than the sidelink relay link quality. In some cases, the uplink link quality may be measured in multiple metrics (e.g., bandwidth (BW), SINR, priority, latency, or the like). In some examples, the sidelink relay link quality may include the combined link quality of the sidelink and the uplink (e.g., an uplink link between the sidelink relay UE 115-*c* and the network entity 105-*a*). In some cases, the link quality may be measured as a minimum of (SINR 1, SINR 2) or a maximum of (latency 1, latency 2). In some examples, the UE 115-a may compare the metric between the uplink and the sidelink relay path and determine the best path to transmit the BFR request to the network entity 105-a.

In some implementations of the present disclosure, the UE 115-a may select an appropriate sidelink relay UE out of a set of sidelink relay UEs for the sidelink assisted BFR request. In some examples, the sidelink relay UE chosen may be connected to the UE 115-a. For example, the UE 115-a is connected to the sidelink relay UE 115-c, and the sidelink relay UE 115-c may pass the conditions for being an appropriate sidelink relay UE to carry the BFR request. As such, the sidelink relay UE 115-c may be used with priority over non-connected appropriate sidelink relay UEs.

As described herein, the UE 115-a may check the sidelink relay UEs that are available to carry the BFR request to the network entity 105-a. The network entity 105-a may set up periodic sidelink transmission resources to setup the sidelink communication. In some examples, the network may pre-configure resources designated for sidelink. In some cases, the UE 115-a is in a first mode (e.g., a network controlled mode) and the network entity 105-a may periodically update a provided list of sidelink relay UEs and resource pool allocations. In other cases, the UE 115-a is in a second mode (e.g., a sensing mode) and the UE 115-a may determine the transmission parameters without assistance form the network entity 105-a. As such, the UE 115-a uses the available resources to transmit the BFR request to the sidelink relay UE 115-c over the sidelink channel 230.

In some implementations, the sidelink relay UE 115-c receives the BFR MAC-CE and may relay the BFR MAC-CE to the network entity 105-a. In some cases, new resources may be available for the uplink transmission from the UE 115-c to the network entity 105-a. In some examples, the UE 115-c may transmit a special physical uplink control channel (PUCCH) BFR SR in the uplink Uu link 235 to obtain an uplink grant to relay the BFR MAC-CE. In some examples, the SR may reuse the existing BFR SR for the Uu link 235 to request uplink resources for relaying the BFR MAC-CE from UE 115-a. In other examples, a new type of SR may relay the BFR request via the uplink Uu link 235 of UE 115-c to inform the network entity 105-a.

In some examples, the UE 115-c may relay the BFR MAC-CE along with an urgent uplink or downlink data transmission from the UE 115-a. In some cases, the UE 115-a may request to recover the uplink or downlink data connection to the UE 115-c. The UE 115-c may transmit this request along with the BFR MAC-CE to the network entity 105-a. In some examples, the UE 115-c may indicate to the UE 115-a that there is enough power and resources to support downlink data for to the UE 115-a based on its own determination or based on the network entity UE 105-a's response. In such cases, the UE 115-c may transmit an additional indication to the UE 115-a that the sidelink channel 230 and the Uu link 235 may support downlink data from the network entity 105-a if there is enough resources available. Additionally or alternatively, the UE 115-a may detect an uplink beam failure and requests to transmit urgent uplink data. In some cases, the UE 115-a may ask the UE 115-c if there are enough resources to support sending the urgent uplink traffic and the BFR MAC-CE. The UE 115-c may transmit this request along with the BFR MAC-CE to the network entity 105-a. In such cases, the UE 115-c may transmit an additional indication to UE 115-a that the sidelink channel 230 and Uu link 235 may support uplink data from the UE 115-a to the network entity 105-a if there is enough resources available. As such, if there are enough resources, the UE 115-c may relay the urgent uplink traffic via from the UE 115-a to the network entity 105-a. In some aspects, the UE 115-a may switch from transmitting and receiving the relayed data to the uplink beam 210 and the downlink beam 215 respectively of the UE 115-a when the corresponding links are restored. As such, these methods for recovering uplink and downlink data connection may keep quality of service (QoS) at a high even when the wireless communication system 200 undergoes a beam failure scenario.

In some implementations of the present disclosure, the UE 115-a may successfully transmit the BFR request to the network entity 105-a. In some aspects, the network entity 105-a may receive the indication of the beam failure occurred at the UE 115-a due to SI or CLI and may transmit a BFR response indicating beam switching actions or training to measure RSRP, CLI, and SI. In some examples, the network entity 105-a may transmit the BFR response via the sidelink relay UE 115-c, via a new downlink beam 240, or via a fallback downlink beam. In some cases, the network entity 105-a may indicate that the downlink beam 215 and the downlink beam 240 fail (e.g., fail as a group), and the UE 115-a may switch to the possible downlink receive beam 250 and the network entity 105-a may switch to a possible downlink transmission beam 245. In some examples, the network entity 105-a may transmit the BFR response directly to the UE 115-a via an active downlink (e.g., another active beam, a failed downlink beam in HD mode) or the sidelink relay UE 115-c that communicated the BFR request.

In some cases, the BFR response may be transmitted via the same sidelink path that was used to transmit the BFR request, in which the BFR response is transmitted over the communication link 235 to the sidelink relay UE 115-c and then over the sidelink channel 230 to the UE 115-a. In some cases, the network entity 105-a may choose to transmit the BFR response using the sidelink relay UE 115-c when the latency of the response via sidelink is less than the latency of the response via DCI on a possible downlink beam or an existing working downlink beam. Additionally or alternatively, the network entity 105-a may transmit the BFR response via sidelink when there is no candidate downlink beam available to carry the message 2 over DCI. In other examples, the network entity 105-a may determine a possibility of failure to receive the message 2 over DCI (e.g., the SI was high, candidate downlink beam may fail). In some aspects, the network entity 105-a may use sidelink to signal helpful actions such as to reduce uplink transmission power or switch to a different uplink transmission beam to aid the reception of message 2. In some cases, the network entity 105-a may indicate to use sidelink in addition to the message 2 over DCI on the candidate downlink beam or the second downlink beam for reliability. In some examples, the network entity 105-a may indicate a beam management procedure (e.g., switching procedure, sweeping procedure) to the UE 115-a which is triggered when receiving the BFR response via sidelink.

In other aspects, the network entity 105-a may transmit the BFR response via the sidelink relay UE 115-c that forwarded the BFR request. In some cases, the network entity 105-a may allocate resources and routing information for the sidelink aided BFR response. In some examples, the network entity 105-a may configure an appropriate downlink and sidelink resources for the sidelink relay UE 115-c. In other examples, the network entity 105-a may use a specified sidelink DCI or MAC-CE to convey the response to a serving cell of the sidelink relay UE 115-c which may relay the response to the sidelink relay UE 115-c and then to the UE 115-a. In some cases, the network entity 105-a may transmit information for the UE 115-a in the BFR response to be delivered via the sidelink relay UE 115-c (e.g., a new downlink grant on a new or indicated downlink beam, TCI state updates, new sidelink grant). In some aspects, the BFR response may carry a UE ID or a BFR request ID to identify which BFR request the network entity 105-a is responding to. In some examples, the identification in the BFR response may be the ID of the uplink grant or sidelink grant that carried the BFR request MAC-CE.

In some implementations, the network entity 105-a may choose to transmit the BFR response using the new candidate downlink beam. In some examples, the network entity 105-a may transmit a message 2 (e.g., a message 4 for CBRA RACH) over DCI on the indicated downlink beam regardless of if the BFR request was received via sidelink. In some examples, the DCI may be transmitted over a special SS (e.g., a BFR SS, any SS). In some cases, the UE 115-a may transmit the BFR MAC-CE to the sidelink relay UE 115-c and may reset the receiving beam to the new candidate downlink beam for monitoring the SSs for the BFR response. Additionally or alternatively, the network entity 105-a may use the second downlink beam of the UE 115-a. In some examples, the network entity 105-a may transmit the BFR response on the downlink beam of the UE 115-a via another active downlink beam (e.g., a mTRP scenario), a fallback beam (e.g., a wide beam), or on the failed downlink beam in HD mode. In some cases, the methods to transmit the BFR response on the downlink beam of the UE 115-a may include transmitting using the failed downlink beam but with additional coding or transmitting using the failed downlink beam at a low modulation and coding scheme (MCS). In some aspects, the network entity 105-a may combine the different methods for transmitting the BFR response on a downlink beam for additional reliability.

In some implementations, the UE 115-a may switch uplink or downlink beams once an allotted time (e.g., X msec) passes when the UE 115-a has received the BFR response. The beams to switch may be decided based on the received BFR response. In some examples, the UE 115-a may receive the BFR response from the network entity 105-a and may switch the uplink or downlink beams on the Uu link to the new indicated beams after a number (e.g., X) of slots. In some examples, the number of slots may be pre-configured by the standards specifications or indicated in the BFR response. In some cases, the UE 115-a may begin to measure the time passed once the BFR response is received (e.g., X msec may be pre-configured on the indicated BFR response). In other examples, the UE 115-a may begin to measure the time passed once the BFR request is transmitted (e.g., X msec may be pre-configured). In some examples, the uplink and downlink beam switches may be indicated and the same allotted time may apply to both of the beam switches.

Figure 3:
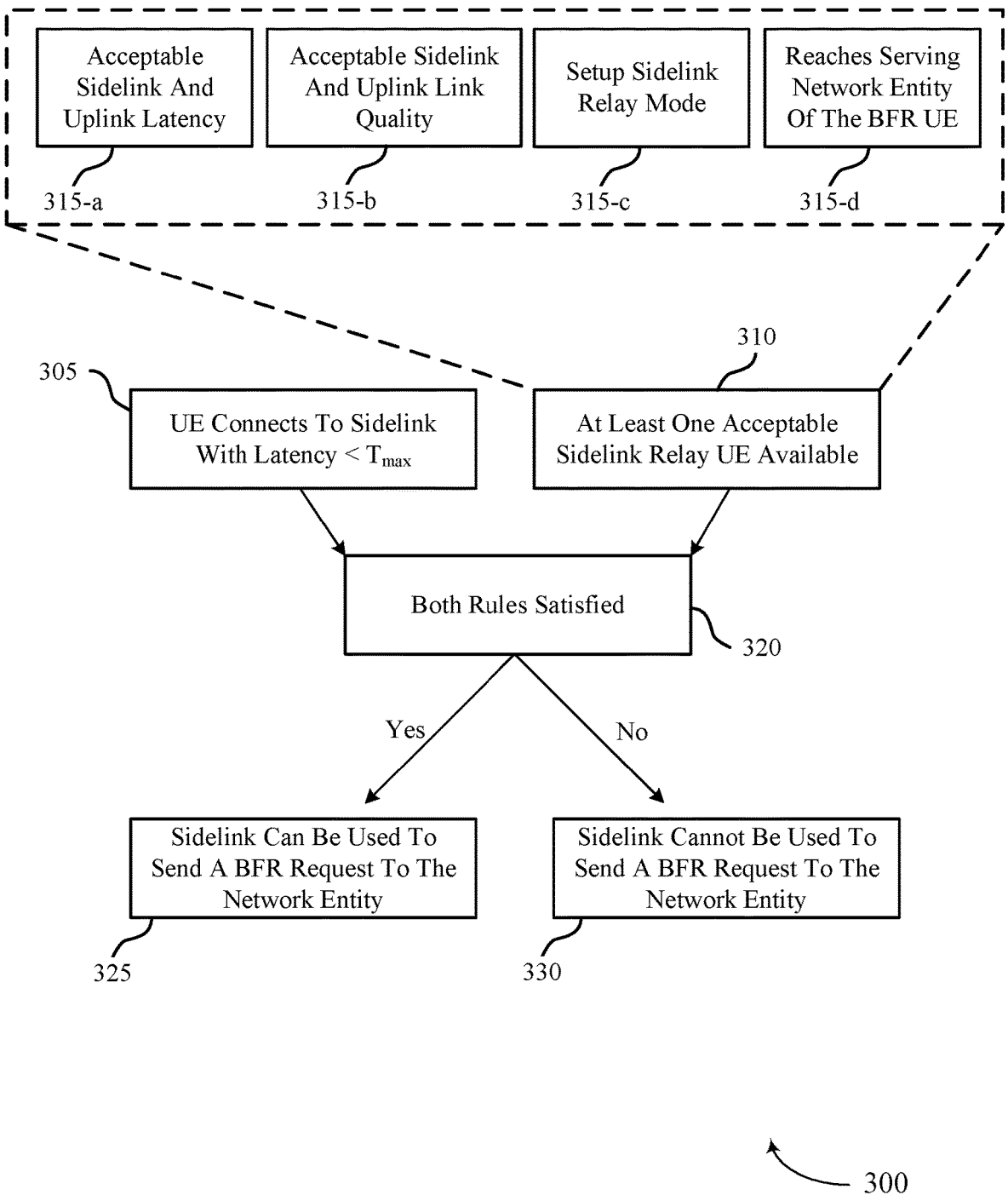
FIG. 3 illustrates an example of a process flow that supports sidelink assisted indication of beam failure in accordance with one or more aspects of the present disclosure.

FIG. 3 illustrates an example of a process flow 300 that supports sidelink assisted indication of beam failure in accordance with one or more aspects of the present disclosure. In some examples, the process flow 300 may be implemented into the wireless communications system 100 and 200. The process flow 300 may be implemented into UEs and network entities, which may be examples of corresponding devices as described herein, including with reference to FIG. 1.

In some examples, a UE may transmit the BFR request to a network entity via sidelink. In some cases, the UE may desire a sidelink relay UE to transmit the BFR request to the network entity. In some examples, the UE may search for a candidate sidelink relay UE that meets a minimum set of conditions 315 to be able to transmit the BFR request. In some cases, the candidate sidelink relay UE may be accepted when the sidelink relay UE is a part of an acceptable sidelink relay UE list, which is constructed by the UE transmitting the BFRE request or the network, or may satisfy the conditions to be labeled as an acceptable sidelink relay UE. For example, the UE that transmits the BFR request may take a set of possible sidelink relay UEs and determine if each sidelink relay UE meets the conditions such as, an acceptable sidelink and uplink latency condition 315-a, an acceptable sidelink and uplink link quality condition 315-b, a setup sidelink relay mode condition 315-c, and a condition for being able to reach the serving network entity for the UE transmitting the BFR request 315-d. In some examples, the conditions may apply for sidelink relay UEs when the UE transmitting the BFR is selecting possible sidelink relay UEs. Additionally or alternatively, the network entity may pre-configure a list of possible sidelink relay UEs.

In some examples, the condition 315-a may check whether the sidelink relay UE meets an acceptable sidelink and uplink latency. In some cases, the sidelink relay UE may pass an acceptable sidelink condition if there is access to a sidelink and an uplink grant with a reasonable delay (e.g., delay relative to another grant) or periodicity (e.g., periodicity of configured grant). In some cases, the latency of sidelink grant may be less than the threshold for a maximum sidelink latency (e.g., $SL<T_{max-SL}$) and the latency of uplink grant may be less than the threshold for a maximum uplink latency (e.g., $UL<T_{max-UL}$), or the sidelink and the uplink grant latency must be less than the total threshold of the maximum sidelink and uplink grant latency (e.g., $SL+UL<T_{max-SL+UL}$) for the sidelink grants and uplink grants to meet an acceptable quality. Additionally or alternatively, the sidelink relay UE may inform the UE transmitting the BFR request about the sidelink and uplink grant availability information for latency calculation purposes. The grant availability information may include a part of a sidelink grant configuration information, SR configuration information, a CG configuration information, or a DG configuration information, in which the information applies to both periodicity and delay based criteria. In some examples, the grant availability information may include a periodicity associated with the uplink grant, a slot offset associated with the uplink grant, a delay between two uplink grants (e.g., delay to the next grant), time and frequency resources per grant occasion, a physical layer uplink priority of data to be sent in the uplink grant (e.g., high, low). In some cases, the arrival time of the next available SR or uplink grant occasion for the sidelink relay UE is signaled and may be less than a specific threshold for a delay based decision. In some examples, the threshold may be related to the RACH periodicity from the UE that transmits the BFR request. In some cases, the threshold is significant to ensure that sending the BFR indication via sidelink is quicker than using a RACH procedure.

In some implementations of the present disclosure, the condition 315-a may check whether the sidelink relay UE meets an acceptable sidelink and uplink latency. In some cases, the sidelink relay UE may pass an acceptable latency condition to be accepted as a sidelink relay UE capable of carrying the BFR request. In some aspects, a latency value may be approximate or exact. In some cases, an approximate latency may be calculated based on the SR periodicity of the BFR UE. In such cases, the SR periodicity may be common across multiple UEs. In other examples, an exact latency may be assigned after communication with a sidelink relay UE or listening to broadcast messages on a sidelink channel. In some examples, the sidelink relay UE may indicate that some SR or uplink grants are unavailable to transmit the BFR request (e.g., due to urgent uplink traffic at the sidelink relay UE). In some examples, the sidelink relay UE may refrain from transmitting the BFR indication because there is a lack of processing time to relay the indication and the sidelink relay UE may be set to wait a certain time amount (e.g., X msec) before sending the next available sidelink grant. In other examples, some of the SR and uplink grants available at the sidelink relay UE may not be available to transmit the BFR indication. Additionally or alternatively, some of the SR and uplink grants may be unable to transmit the BFR indication due to priority reasons, in which lower priority SR or uplink grants may be cancelled by the sidelink relay UE.

In some aspects, the condition 315-b may check if the sidelink relay UE meets an acceptable sidelink and uplink link quality. In some examples, the uplink quality of the sidelink relay UE may meet an acceptable link quality (e.g., X dB SINR, X megabits per second (Mbps) throughput, or the like) and the sidelink of the sidelink relay UE may have an acceptable link quality. In some cases, the sidelink relay UE may broadcast or unicast a downlink quality or an estimated uplink quality for each cell ID or network entity ID. In some examples, the sidelink quality of the sidelink relay UE may be evaluated using RSRP of sidelink RSs by the UE that transmits the BFR request. In some examples, the basis of acceptable link quality may use thresholds that may be defined for the UE or by the UE that transmits the BFR request.

In other cases, the condition 315-c may check if the sidelink relay UE is set up in a relay mode. In some cases, the sidelink UE may setup in a relay mode. In some examples, the sidelink relay UE may declare the capability for sidelink relaying by transmitting an indicator periodically on a periodic channel (e.g., inside discovery messages) or as a one-time indicator through a message (e.g., a L1, L2, or L3 message) which is sent via a common broadcast channel or a dedicated channel. In some cases, the sidelink UE may further declare in the transmitted indicator, whether it is capable of relaying data, MAC-CEs or both.

In some aspects, the condition 315-d may check if the sidelink relay UE is able to reach an intended network entity that the UE sends the BFR request to. In some examples, the sidelink relay UE may transmit identifiers of possible nodes to communicate to using the UE that transmits the BFR request. In some cases, the sidelink relay UE may list IDs for at least one distributed unit (DU) ID, TRP ID (e.g., coresetPool Index), cell ID (e.g., physical cell ID (PCI)), or network entity ID (e.g., gNB ID).

Additionally or alternatively, the candidate sidelink relay UE that may transmit the BFR request to the network entity may be evaluated against some additional conditions. For example, the sidelink relay UE may establish a sidelink BFR MAC-CE logical channel priority for the sidelink and the Uu uplink. In some cases, the channel priority may determine what to do with the BFR request in respect to the uplink logical channels available for the sidelink relay UE. In some examples, the priority for BFR MAC-CE may be defined by a standard or the sidelink relay UE may indicate the priority.

In other cases, the candidate sidelink relay UE used to transmit the BFR request to the network entity may be evaluated against a set of conditions for receiving a BFR response from the network entity. In some examples, the conditions described herein for transmitting the BFR request via sidelink may still apply for the candidate sidelink relay UE when transmitting the BFR response via sidelink the UE that transmitted the BFR request. However, in some cases, the candidate sidelink relay UE may miss some conditions to transmit the BFR response. In some aspects, the network entity may be flexible and may provide downlink or sidelink allocations to meet the conditions. In some examples, the network entity may use the same sidelink that the UE transmitted the BFR request to indicate the BFR response or may provide the downlink or sidelink configurations necessary to communicate to the UE that transmitted the BFR. In other examples, the network entity may configure an additional (e.g., new) sidelink relay UE or using an existing downlink connection to transmit the BFR response.

In some aspects, the UE transmitting the BFR request may be based on a connection to a sidelink UE with an acceptable latency (e.g., latency satisfying a threshold). In some cases, in a first mode, the UE that transmits the BFR request may have access to a sidelink grant configured by the network entity 105-a. In other cases, in a second mode, the UE that transmits the BFR request may have the ability to sense and allocate sidelink resources without assistance of the network entity 105-a. In some cases the UE that transmits the BFR request may transmit the BFR request via sidelink if it has a sidelink grant with a periodicity that is less than $T_{max}$ in msec (e.g., UE may connect to sidelink with a latency value<$T_{max}$) In some examples, the $T_{max}$ is network configured and may depend on (e.g., equal to) the RACH configuration periodicity. Additionally or alternatively, the UE which transmits the BFR request may not have a sidelink grant with a periodicity less than $T_{max}$ in msec, and sidelink may not be considered usable for BFR purposes and the UE transmits the BFR request via other methods such as RACH, SR, existing uplink allocation, or a HD uplink occasion. Additionally or alternatively, the network may change the latency rule to determine the usability of the sidelink and may instead delay to the next sidelink occasion being less than $T_{max}$ in msec (e.g., the UE should be able to connect to a sidelink UE in a next sidelink occasion<$T_{max}$) to make the latency condition more specific.

In some aspects of the present disclosure, the UE may determine to transmit the BFR request via sidelink based on some conditions. For example, the UE transmitting the BFR request may evaluate a set of multiple candidate sidelink relays under some conditions. For example, a condition 305 may determine if one of the set of multiple candidate sidelink relays may connect to sidelink with a latency less than a threshold. Additionally or alternatively, a condition 310, may determine if the one of the set of multiple candidate sidelink relays meets the minimum conditions 315 and is acceptable to relay the BFR request. In some cases, the candidate sidelink relay UE may pass both conditions 305 (at 320) and condition 310, and an approval 325 may indicate that the candidate sidelink relay UE may be used to transmit the BFR request to the network entity. In other cases, the candidate sidelink relay UE pay not pass both conditions 305 and condition 310, and a disapproval 330 may indicate that the candidate sidelink relay UE may not be used to transmit the BFR request to the network entity.

Figure 4:
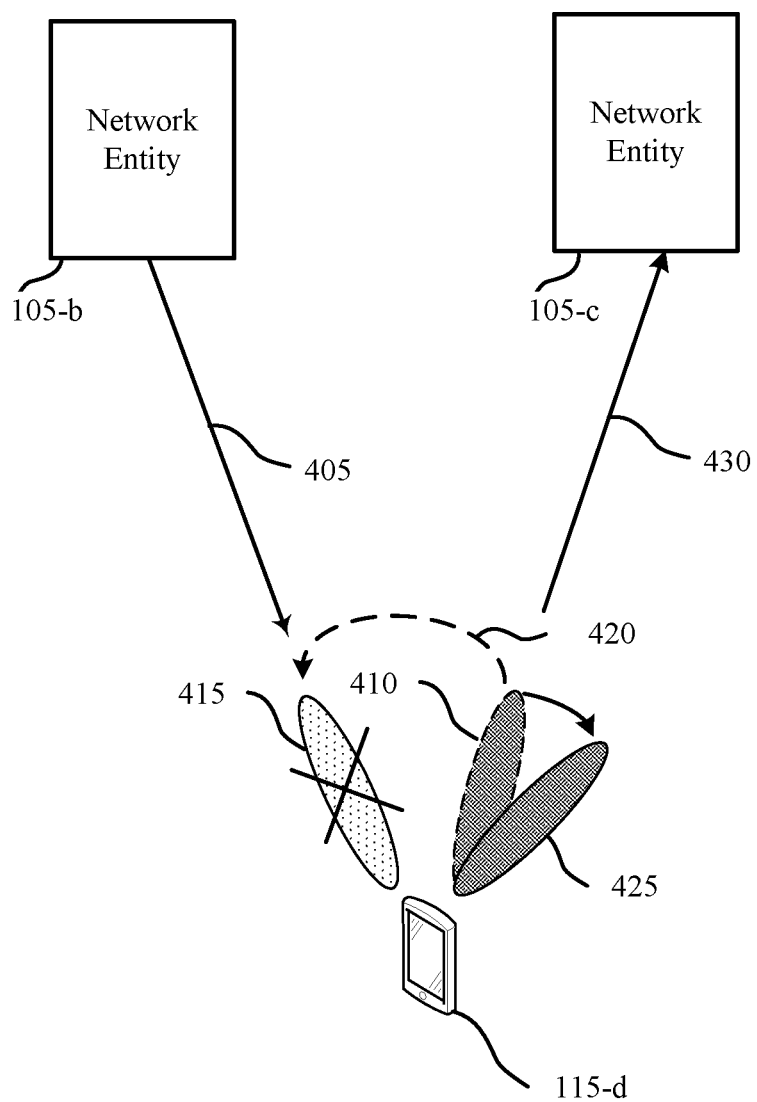
FIG. 4 illustrates an example of a wireless communications system that supports sidelink assisted indication of beam failure in accordance with one or more aspects of the present disclosure.

FIG. 4 illustrates an example of a wireless communications system 400 that supports sidelink assisted indication of beam failure in accordance with one or more aspects of the present disclosure. In some examples, the wireless communications system 400 may implement aspects of the wireless communications system 100 and 200. The wireless communications system 400 may include a UE 115-d, a network entity 105-b, and a network entity 105-c, which may be examples of corresponding devices as described herein, including with reference to FIGS. 1 and 2. In some examples, the network entity 105-b may use a downlink channel 405 for one or more downlink beams to the UE 115-d and may use an uplink channel 430 for one or more uplink beams to the network entity 105-c.

In some aspects, a network entity may transmit the BFR response to the UE containing indication to change the downlink beam to avoid cases of high SI or CLI in specific directions. In some examples, the network entity 105-a may switch to a HD mode, keep high priority traffic and dropping other traffic, or reducing uplink transmission power in cases that may experience high SI responses. In some cases, the network entity 105-a may indicate a change in uplink transmission beam to a fallback uplink beam 425 with a low SI or trigger a new uplink transmission beam selection that with an SI measurement. In other examples, the network entity 105-a may reduce uplink transmission power of interfering UEs, switch to a fallback uplink beam of an interfering UE, trigger a new uplink beam selection for the interfering UE with a CLI measurement, or trigger a sidelink assisted low overhead beam selection for the UE transmitting the BFR request and for the interfering UE. In some examples, the UE transmitting the BFR request may decide the sidelink assisted low overhead beam selection for the interfering UE based on sidelink discovery.

In some implementations of the present disclosure, the BFR response from the network entity may depend on the reasoning for beam failure. In some examples, the BFR response from the network entity may indicate a change in the downlink beam at the UE that transmits the BFR request to avoid high SI or CLI directions. In some cases, the downlink beam may be changed for any reason of beam failure, such as a downlink blockage, SI, or CLI. In some examples, the UE may receive an indication of the new downlink beam which may be the preferred downlink beam of the UE indicated in its BFR request or a different downlink beam.

In the wireless communications system 400, the UE 115-d may indicate in its BFR request that the beam failure was caused by SI. In some examples, the network entity 105-b may command the UE 115-d to switch to HD mode. In some cases, the HD mode may be duplex in time or frequency (e.g., fully, partially, or non-overlapping). In such cases, the UE 115-d may use some fallback resource allocation for the HD mode or may be provided with resource allocation from the network entity 105-b for the HD mode. In some examples, the one or more uplink and downlink transmissions at the UE 115-d may be dropped based on priority traffic (e.g., URLLC is prioritized over eMBB traffic).

In some examples, the beam failure at the UE 115-d may be caused by an SI 420. In some examples, the network entity 105-b may command the UE 115-d to reduce power in an uplink beam 410 that may be causing the interference 420 to the downlink beam 415. In some examples, the UE 115-d may request how much uplink transmission power reduction may be necessary for a downlink beam 415 to be functional in FD with the uplink beam 410. In some cases, the UE 115-d may receive a BFR response from the network entity 105-b via downlink indicating a switch from the uplink beam 410 to a fallback uplink beam 425 with low SI with respect to the failing downlink beam 415. In some cases, the UE 115-d may measure a high SI even with the fallback beam 425 and may fall back to the HD mode or cancel the uplink transmission. In some examples, the UE 115-d may receive an indication of a new uplink beam and may change its uplink beam to the indicated uplink beam. The indicated uplink beam in this case may be the preferred uplink beam indicated by the UE 115-d in its BFR request or a different uplink beam.

In some aspects, the beam failure at the UE 115-d may be caused by an SI 420. In some examples, the network entity 105-d may trigger an SI measurement process at the UE 115-d which may sweep uplink, downlink, or both beams. In some cases, a report of a number (e.g., K) of beams or beam pairs below an interference threshold may be sent to the UE 115-d via an uplink transmission or sidelink. In some cases, the network entity 105-c may further select beams or beam pairs from the UE reported beams or beam pairs in order to optimize the downlink or uplink SINRs. In some cases, optimization occurs and a selected uplink or a selected uplink and downlink pair may be indicated to the UE 115-d.

In some examples, the UE 115-d may indicate a beam failure for an uplink beam may have been caused by CLI. In some cases, a network entity may communicate with the interfering UE (e.g., the source of CLI) and request to reduce power in its interfering uplink beam or to switch the interfering uplink beam to a different or fallback uplink beam with a low CLI. In some cases, the interfering UE may switch to a more favorable uplink beam and the UE 115-d may retry an uplink transmission with the downlink beam that failed. In some examples, the UE 115-d may measure high CLI even after the network entity signals that it has responded to the beam failure request. In such cases, the UE 115-d may fall back to the HD mode or cancel the uplink transmission. In some cases, the method may apply to flexible TDD modes where neighboring cells have different directions of communication ongoing at the same time (e.g., downlink in first cell and uplink in a second cell).

In some implementations, the UE 115-d may indicate a beam failure for an uplink beam may have been caused by CLI. In some cases, a network entity may indicate a CLI measurement routine where the interfering UE may transmit uplink RSs and sweep through the uplink beams. In some cases, the UE 115-d may measure CLI on the configured CLI measurement resources. In some examples, the network entity may perform beam sweeping for the UE 115-d to measure on multiple downlink beams. In some cases, the UE 115-d may collect a report which includes a number (e.g., K) of beams or beam pairs that may satisfy a CLI threshold at the UE 115-d and may transmit the report to the network entity via uplink or sidelink. In some examples, the interfering UE may measure SINR on one or more downlink beams during its uplink RS transmissions. In some cases, the interfering UE may collect a report which includes a number (e.g., M) of beams or beam pairs that may satisfy a SINR threshold. In some examples, the network entity may further select beams or beam pairs from the reported beams or beam pairs to optimize the downlink beam that failed at the UE or the uplink of the interfering UE. In some cases, the network entity signals a selected uplink beam or downlink and uplink beam pair to the interfering UE via downlink. Additionally or alternatively, the network entity may signal a new uplink beam or a downlink and uplink beam pair to the UE 115-d. In some cases, the method applies to flexible TDD modes where neighboring cells have different directions of communication ongoing at the same time (e.g., downlink in first cell and uplink in a second cell).

In some examples, the network entity may identify that the UE 115-d and the interfering UE are in the same cell or the interfering UE was a sidelink relay UE. In some cases, the UE 115-*d* may communicate with the interfering UE via sidelink. In some examples, the network entity may configure both of the UEs to perform sidelink assisted, low overhead beam selection. In some cases, the interfering UE may sweep a set of uplink beams and the UE 115-*d* may transmit a report of the measured CLI to the interfering UE via sidelink either as the measured CLI, measured SINR or the set of (e.g., K) best measured beams. Additionally or alternatively, the UE 115-*d* may sweep downlink beams to measure the CLI. In some cases, and intelligent beam sweeping algorithm may be implemented between the interfering UE and the UE 115-*d* which may enable faster beam selection using an iterative process of uplink and downlink beam updating via sidelink based signaling. In some examples, the intelligent beam sweeping algorithm may be Machine Learning based or include sparse reconstruction based beam. In some examples, a report of a number (e.g., K) of uplink beams of the interfering UE or a number (e.g., K) of downlink beams of the UE 115-*d* or a number (e.g., K) of beam pairs of uplink and downlink beams that may satisfy the CLI threshold is transmitted to the network entity via the uplink of the UE 115-*d* or the uplink of the interfering UE In some aspects, the network entity signals appropriate uplink and downlink beam pairs of both UEs based on the optimization of a joint uplink SINR and downlink SINR at both UEs. In some cases, the method applies to flexible TDD modes.

Figure 5:
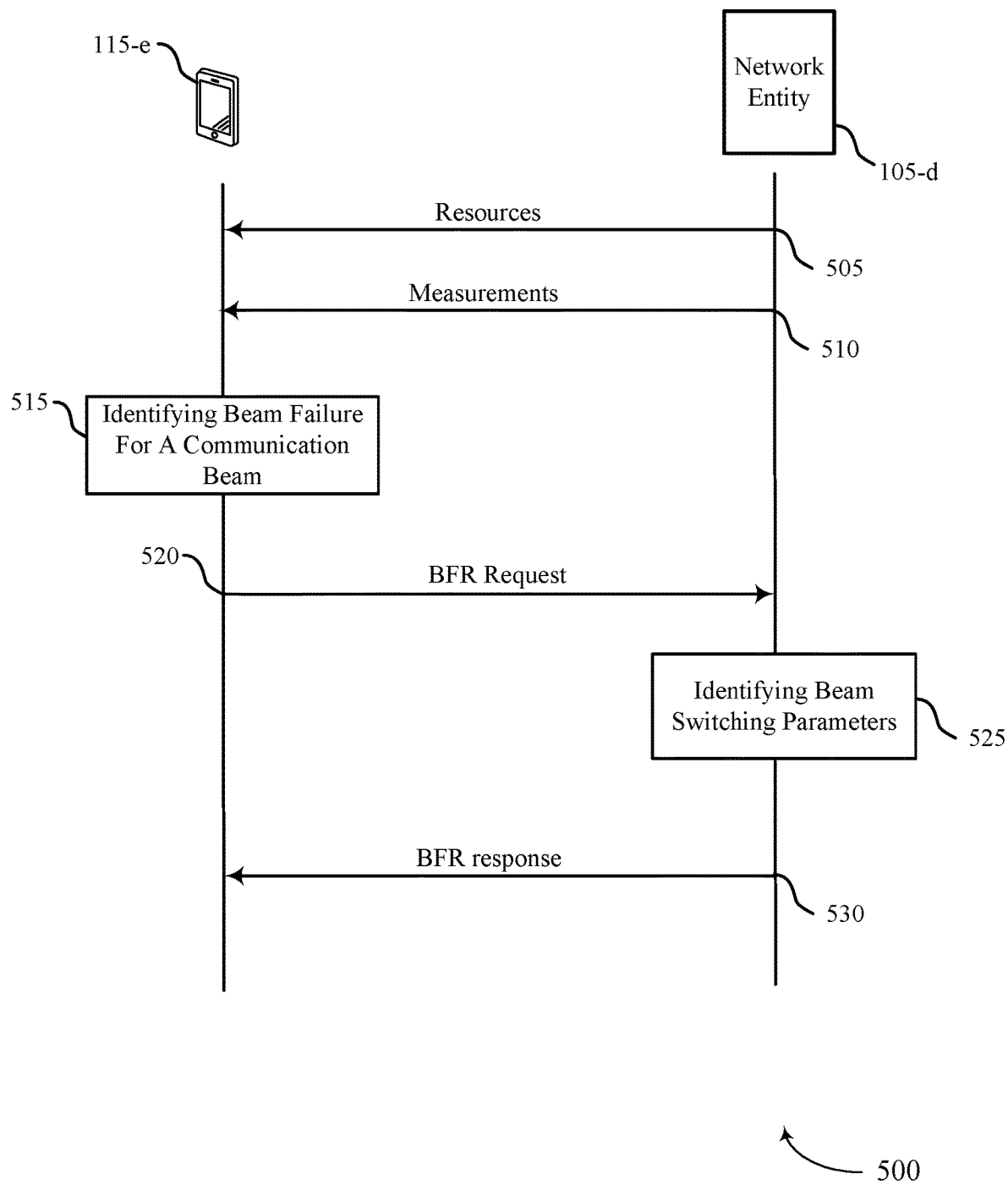
FIG. 5 illustrates an example of a process flow that supports sidelink assisted indication of beam failure in accordance with one or more aspects of the present disclosure.

FIG. 5 illustrates an example of a process flow 500 that supports sidelink assisted indication of beam failure in accordance with one or more aspects of the present disclosure. In some examples, the process flow 500 may implement aspects of the wireless communications systems 100, 200, or 400. The process flow 500 may include a UE 115-*e* and a network entity 105-*d*, which may be examples of corresponding devices as described herein, including with reference to FIGS. 1-4.

At 505, the network entity 105-*d* may transmit an indication of one or more resources associated with a set of multiple BFD-RSs. In some examples, the network entity 105-*d* may indicate configured resources within the BFD-RSs to the UE 115-*e*. At 510, the network entity 105-*d* may periodically transmit a RSRP measurement, a SI measurement, and a CLI measurement based on the resources associated with the set of multiple BFD-RSs.

At 515, the UE 115-*e* may identify a beam failure for one or more communication beams at the UE 115-*e*. In some examples, the beam failure is associated with a type of interference, such as RSRP, SI, or CLI, and may identify the beam failure for an uplink beam or a downlink beam for the UE 115-*e*.

At 520, the UE 115-*e* may transmit a BFR request to the network entity 105-*d*. In some cases, the UE 115-*e* may determine to transmit the BFR request with an available sidelink relay UE based on the sidelink relay UE meeting threshold values. The sidelink relay UE may be approved for relaying the BFR request and the UE 115-*e* may transmit the BFR request via a sidelink channel to the network entity 105-*d*. In some cases, the BFR request includes transmitting a control signaling including an indication of an increased SI, an indication of an increased CLI, an identifier for the SI causing the beam failure, an identifier for the CLI causing the beam failure, an uplink beam identifier causing the SI, a TRP identifier associated with the beam failure, a UE identifier, a cell identifier, an indication of a set of preferred beams for downlink or uplink or both, or a combination of indicators.

At 525, the network entity 105-*d* receives the BFR request that includes whether a beam failure at the UE 115-*e* is associated with SI or CLI and identifies possible beam switching parameters based on the BFR request. In some cases, the beam switching parameters may identify a possible candidate beam for communication between the UE 115-*e* and the network entity 105-*d*.

At 530, the network entity 105-*d* may transmit a BFR response that includes the one or more beam switching parameters based on the BFR request. In some examples, the BFR response may indicate a change in the uplink beam or the downlink beam for the UE 115-*e* based on the type of beam failure. In some cases, the BFR response may include a request for the UE 115-*e* to switch from a FD mode to a HD mode. The UE 115-*e* may receive the BFR response and initiate a beam training procedure using the RSRP measurement resources, the SI measurement resources, and the CLI measurement resources to establish a second communication beam to the network entity 105-*d*.

Figure 6:
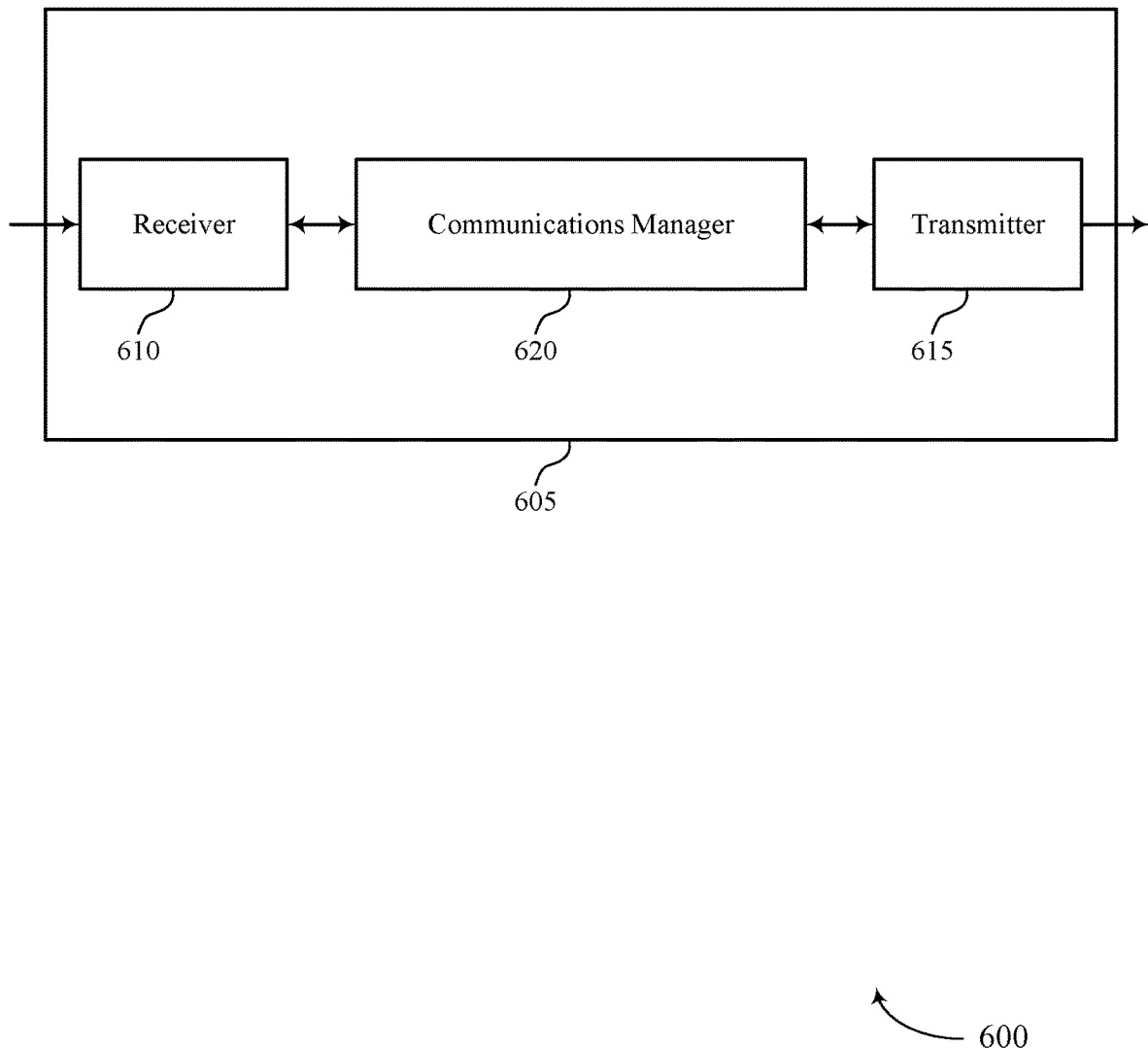
FIGS. 6 and 7 show block diagrams of devices that support sidelink assisted indication of beam failure in accordance with one or more aspects of the present disclosure.

FIG. 6 shows a block diagram 600 of a device 605 that supports sidelink assisted indication of beam failure in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink assisted indication of beam failure). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink assisted indication of beam failure). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sidelink assisted indication of beam failure as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for identifying a beam failure of at least one communication beam at the UE. The communications manager 620 may be configured as or otherwise support a means for transmitting, to a network entity and via a sidelink channel, a beam failure recovery request including an indication of whether the beam failure is associated with a self-interference or a cross-link interference. The communications manager 620 may be configured as or otherwise support a means for receiving a beam failure recovery response indicating one or more beam switching parameters based on the beam failure recovery request including the indication of whether the beam failure is associated with the self-interference or the cross-link interference.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
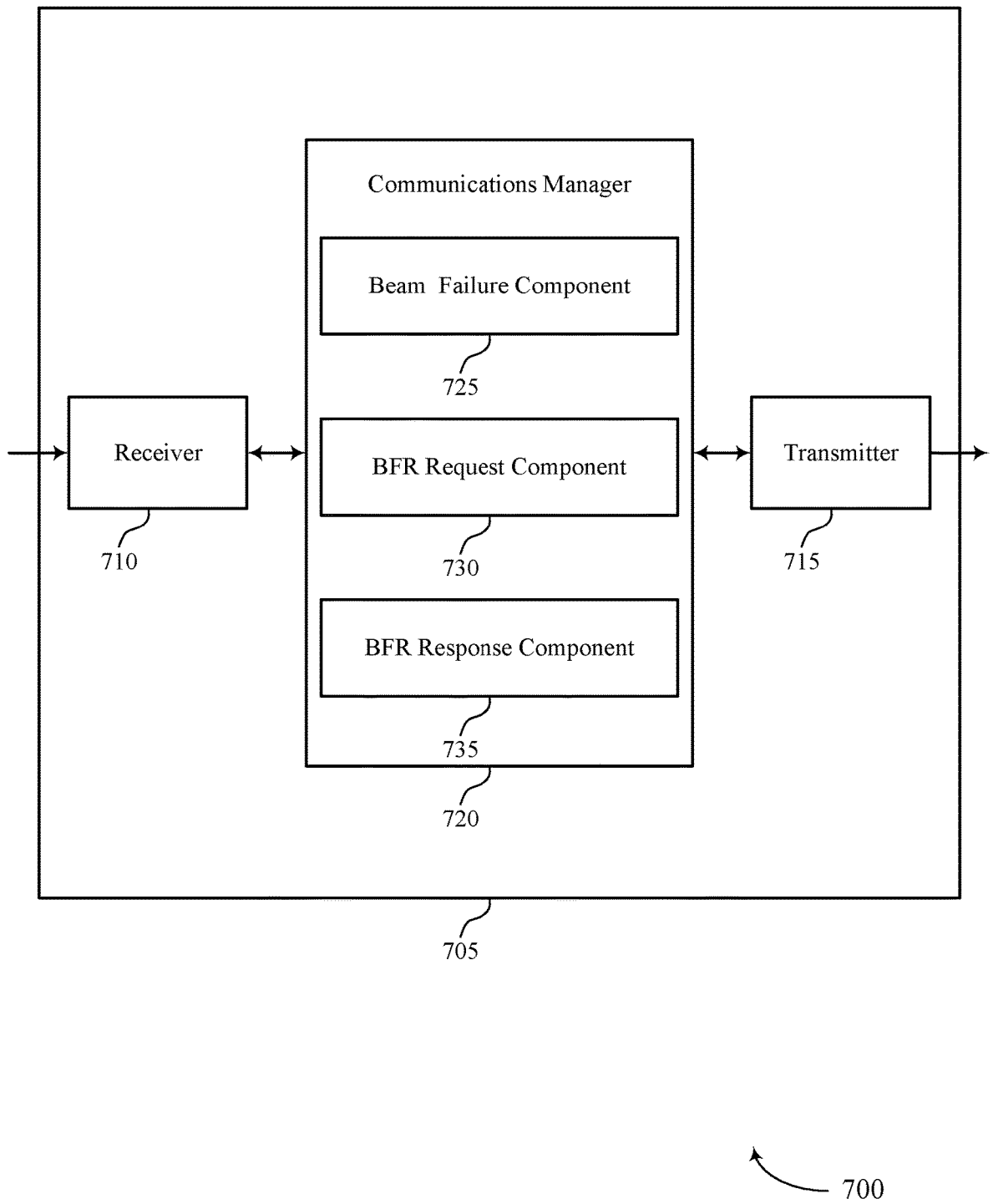

FIG. 7 shows a block diagram 700 of a device 705 that supports sidelink assisted indication of beam failure in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sidelink assisted indication of beam failure). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sidelink assisted indication of beam failure). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sidelink assisted indication of beam failure as described herein. For example, the communications manager 720 may include a beam failure component 725, an BFR request component 730, an BFR response component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The beam failure component 725 may be configured as or otherwise support a means for identifying a beam failure of at least one communication beam at the UE. The BFR request component 730 may be configured as or otherwise support a means for transmitting, to a network entity and via a sidelink channel, a beam failure recovery request including an indication of whether the beam failure is associated with a self-interference or a cross-link interference. The BFR response component 735 may be configured as or otherwise support a means for receiving a beam failure recovery response indicating one or more beam switching parameters based on the beam failure recovery request including the indication of whether the beam failure is associated with the self-interference or the cross-link interference.

Figure 8:
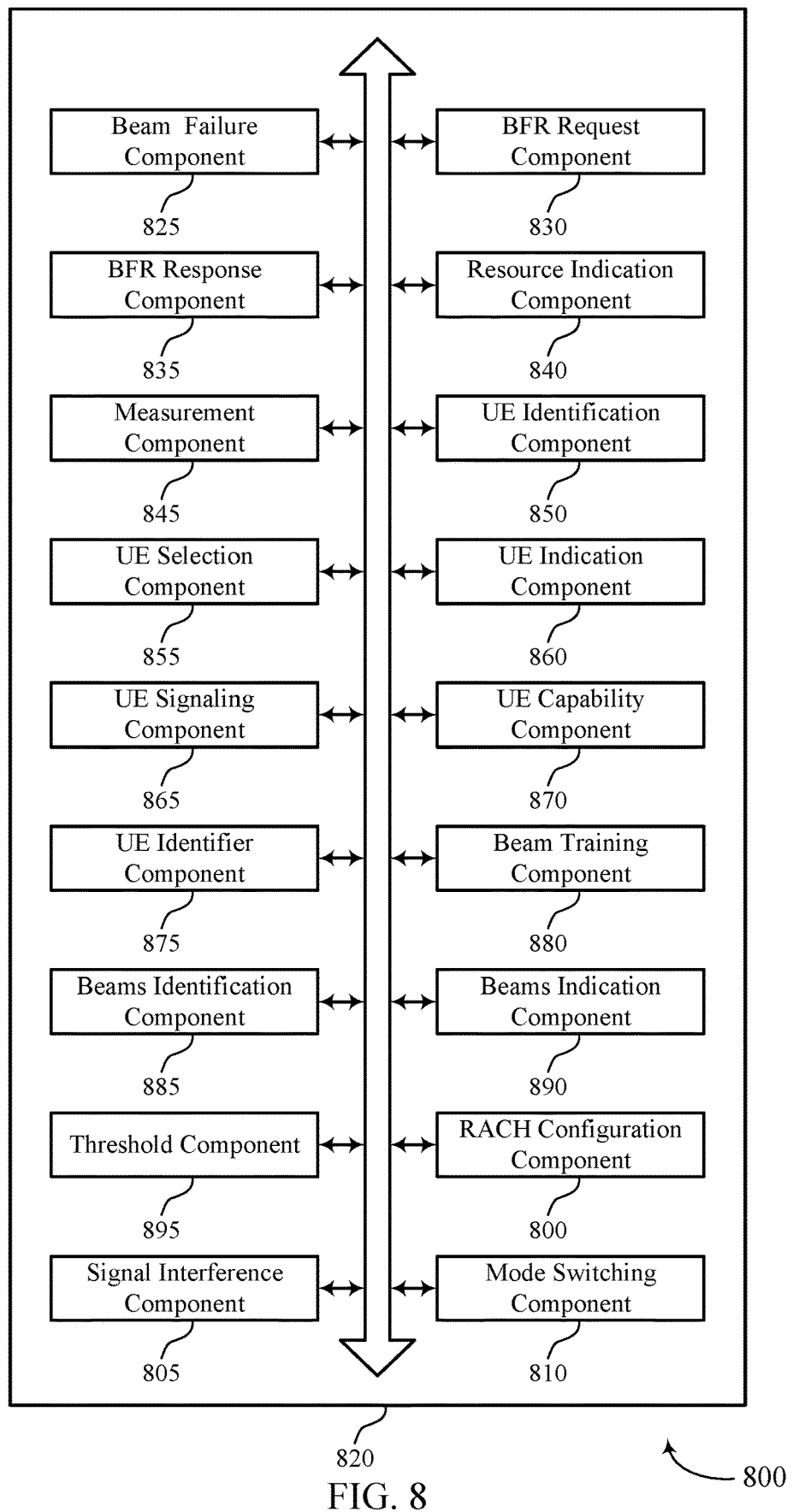
FIG. 8 shows a block diagram of a communications manager that supports sidelink assisted indication of beam failure in accordance with one or more aspects of the present disclosure.

FIG. 8 shows a block diagram 800 of a communications manager 820 that supports sidelink assisted indication of beam failure in accordance with one or more aspects of the present disclosure. The communications manager 820 may be an example of aspects of a communications manager 620, a communications manager 720, or both, as described herein. The communications manager 820, or various components thereof, may be an example of means for performing various aspects of sidelink assisted indication of beam failure as described herein. For example, the communications manager 820 may include a beam failure component 825, an BFR request component 830, an BFR response component 835, a resource indication component 840, a measurement component 845, a UE identification component 850, a UE selection component 855, a UE indication component 860, a UE signaling component 865, a UE capability component 870, a UE identifier component 875, a beam training component 880, a beams identification component 885, a beams indication component 890, a threshold component 895, a RACH configuration component 8100, a signal interference component 8105, a mode switching component 8110, or any combination thereof. Each of these components may communicate, directly or indirectly, with one another (e.g., via one or more buses).

The communications manager 820 may support wireless communication at a UE in accordance with examples as disclosed herein. The beam failure component 825 may be configured as or otherwise support a means for identifying a beam failure of at least one communication beam at the UE. The BFR request component 830 may be configured as or otherwise support a means for transmitting, to a network entity and via a sidelink channel, a beam failure recovery request including an indication of whether the beam failure is associated with a self-interference or a cross-link interference. The BFR response component 835 may be configured as or otherwise support a means for receiving a beam failure recovery response indicating one or more beam switching parameters based on the beam failure recovery request including the indication of whether the beam failure is associated with the self-interference or the cross-link interference.

In some examples, the resource indication component 840 may be configured as or otherwise support a means for receiving, from the network entity, an indication of one or more resources associated with a set of multiple beam failure detection reference signals. In some examples, the measurement component 845 may be configured as or otherwise support a means for periodically obtaining at least one of a reference signal received power measurement, a self-interference measurement, and a cross-link interference measurement based on the one or more resources.

In some examples, to support transmitting the beam failure recovery request, the BFR request component 830 may be configured as or otherwise support a means for transmitting a control signaling including at least one of an indication of an increased self-interference, an indication of an increased cross-link interference, an identifier for the self-interference causing the beam failure, an identifier for the cross-link interference causing the beam failure, a cross-link interference beam indication causing cross-link interference, an uplink beam identifier causing the self-interference, a transmission-reception point identifier associated with the beam failure, a UE identifier, a cell identifier, an indication of a set of preferred beams for downlink or uplink or both, or a combination thereof.

In some examples, the UE identification component 850 may be configured as or otherwise support a means for identifying a set of multiple sidelink relay UEs for transmitting the beam failure recovery request. In some examples, the UE selection component 855 may be configured as or otherwise support a means for selecting a sidelink relay UE of the set of multiple sidelink relay UEs for transmitting the beam failure recovery request based on determining that the UE is able to connect to the sidelink relay UE using a latency value satisfying a threshold latency value.

In some examples, the threshold component 895 may be configured as or otherwise support a means for identifying the set of multiple sidelink relay UEs for transmitting the beam failure recovery request based on each sidelink relay UE of the set of multiple sidelink relay UEs being associated with at least one of a threshold sidelink latency, a threshold uplink latency, a threshold sidelink link quality, a threshold uplink link quality, sidelink relay mode setup parameters, a connectivity between each sidelink relay UE and the network entity, a connectivity between each sidelink relay UE and a second network entity, or a combination thereof.

In some examples, to support transmitting the beam failure recovery request, the BFR request component 830 may be configured as or otherwise support a means for transmitting, to the sidelink relay UE of the set of multiple sidelink relay UEs, the beam failure recovery request based on one or more conditions.

In some examples, the RACH configuration component 8100 may be configured as or otherwise support a means for receiving, from the network entity, an indication of the threshold latency value, where the threshold latency value is based on a random access channel configuration periodicity.

In some examples, the UE is able to connect to the sidelink relay UE using a sidelink grant or sensed sidelink resources.

In some examples, the UE indication component 860 may be configured as or otherwise support a means for receiving, from a sidelink relay UE, an indication of at least one of an uplink grant availability at the sidelink relay UE, a periodicity associated with the uplink grant, an offset associated with the uplink grant, a delay to between two uplink grants, time and frequency resources per occasion, a physical layer uplink priority, or a combination thereof, where the uplink grant availability is based on a scheduling request information, a configured grant information, a dynamic grant information, a dynamic grant information.

In some examples, the UE signaling component 865 may be configured as or otherwise support a means for receiving, from a sidelink relay UE, a signaling indicating a downlink quality or an estimated uplink quality or both for each cell identifier or network entity identifier associated with the sidelink relay UE, where the signaling includes broadcast signaling or unicast signaling.

In some examples, the UE capability component 870 may be configured as or otherwise support a means for receiving, from a sidelink relay UE, an indicator indicating a relaying capability of the sidelink relay UE, where the indicator is received periodically or periodically.

In some examples, the UE identifier component 875 may be configured as or otherwise support a means for receiving, from a sidelink relay UE, at least one of a distributed unit identifier, a transmission reception point identifier, a cell identifier, a network entity identifier, or a combination thereof.

In some examples, to support receiving the beam failure recovery response, the BFR response component 835 may be configured as or otherwise support a means for receiving the beam failure recovery response indicating a change in uplink beam or downlink beam for the UE based on whether the beam failure is associated with the self-interference or the cross-link interference.

In some examples, to support receiving the beam failure recovery response, the BFR response component 835 may be configured as or otherwise support a means for receiving the beam failure recovery response including a request for the UE to switch from a full-duplex mode to a half-duplex mode.

In some examples, to support receiving the beam failure recovery response, the BFR response component 835 may be configured as or otherwise support a means for receiving the beam failure recovery response initiating a beam training procedure using at least one of reference signal received power measurement resources, self-interference measurement resources, and cross-link interference measurement resources. In some examples, to support receiving the beam failure recovery response, the beam training component 880 may be configured as or otherwise support a means for performing the beam training procedure to establish a second communication beam.

In some examples, to support receiving the beam failure recovery response, the BFR response component 835 may be configured as or otherwise support a means for receiving the beam failure recovery response including a command to reduce power associated with an uplink beam at the UE, where the beam failure recovery response is based on the beam failure being associated with the self-interference.

In some examples, to support receiving the beam failure recovery response, the BFR response component 835 may be configured as or otherwise support a means for receiving the beam failure recovery response including a command for the UE to switch a first uplink beam to a second uplink beam, where the first uplink beam has a greater signal interference with the at least one communication beam than the second uplink beam, and where the beam failure recovery response is based on the beam failure being associated with the self-interference.

In some examples, the signal interference component 8105 may be configured as or otherwise support a means for determining that a signal interference between the second uplink beam and the at least one communication beam is greater than a threshold value. In some examples, the mode switching component 8110 may be configured as or otherwise support a means for switching to a half-duplex mode from a full-duplex mode or canceling an uplink transmission based on the signal interference being greater than the threshold value.

In some examples, to support receiving the beam failure recovery response, the BFR response component 835 may be configured as or otherwise support a means for receiving the beam failure recovery response including a trigger to initiate a process for uplink beam selection with signal interference measurement, where the beam failure recovery response is based on the beam failure being associated with the cross-link interference.

In some examples, the BFR request component 830 may be configured as or otherwise support a means for transmitting, to a second UE associated with the cross-link interference, a set of intermediate cross-link interference reports based on identifying the beam failure. In some examples, the beams identification component 885 may be configured as or otherwise support a means for identifying a set of beams satisfying a cross-link interference threshold based on transmitting the set of intermediate cross-link interference reports. In some examples, the beams indication component 890 may be configured as or otherwise support a means for transmitting an indication of the set of beams satisfying the cross-link interference threshold.

In some examples, the indication of the set of beams satisfying the cross-link interference threshold is transmitted to the network entity from the UE or transmitted to the network entity via the second UE.

Figure 9:
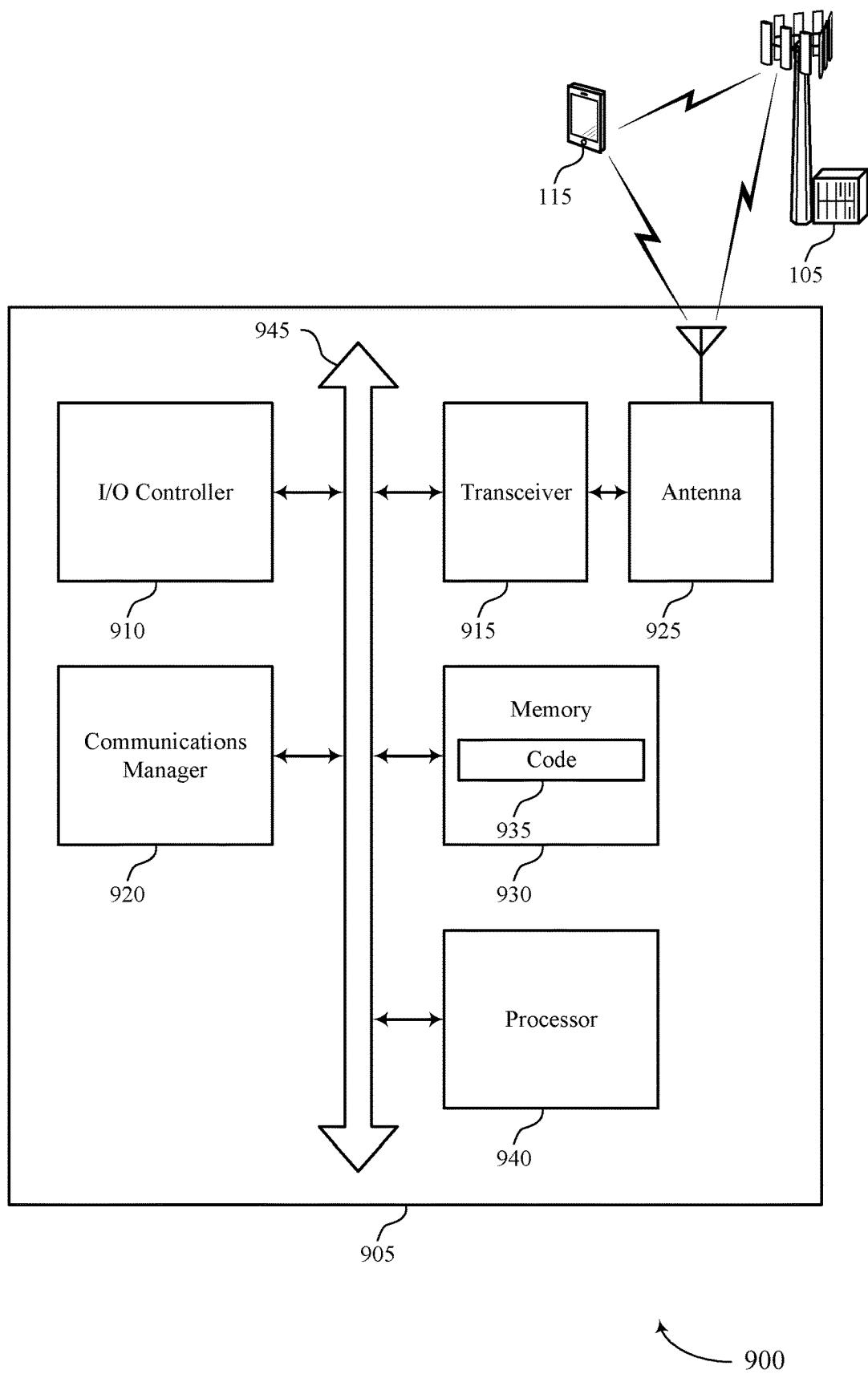
FIG. 9 shows a diagram of a system including a device that supports sidelink assisted indication of beam failure in accordance with one or more aspects of the present disclosure.

FIG. 9 shows a diagram of a system 900 including a device 905 that supports sidelink assisted indication of beam failure in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink assisted indication of beam failure). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for identifying a beam failure of at least one communication beam at the UE. The communications manager 920 may be configured as or otherwise support a means for transmitting, to a network entity and via a sidelink channel, a beam failure recovery request including an indication of whether the beam failure is associated with a self-interference or a cross-link interference. The communications manager 920 may be configured as or otherwise support a means for receiving a beam failure recovery response indicating one or more beam switching parameters based on the beam failure recovery request including the indication of whether the beam failure is associated with the self-interference or the cross-link interference.

By including or configuring the communications manager 920 in accordance with examples as described herein, the device 905 may support techniques for improved communication reliability, reduced latency, improved user experience related to reduced processing, reduced power consumption, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sidelink assisted indication of beam failure as described herein, or the processor 940 and the memory 930 may be otherwise configured to perform or support such operations.

Figure 10:
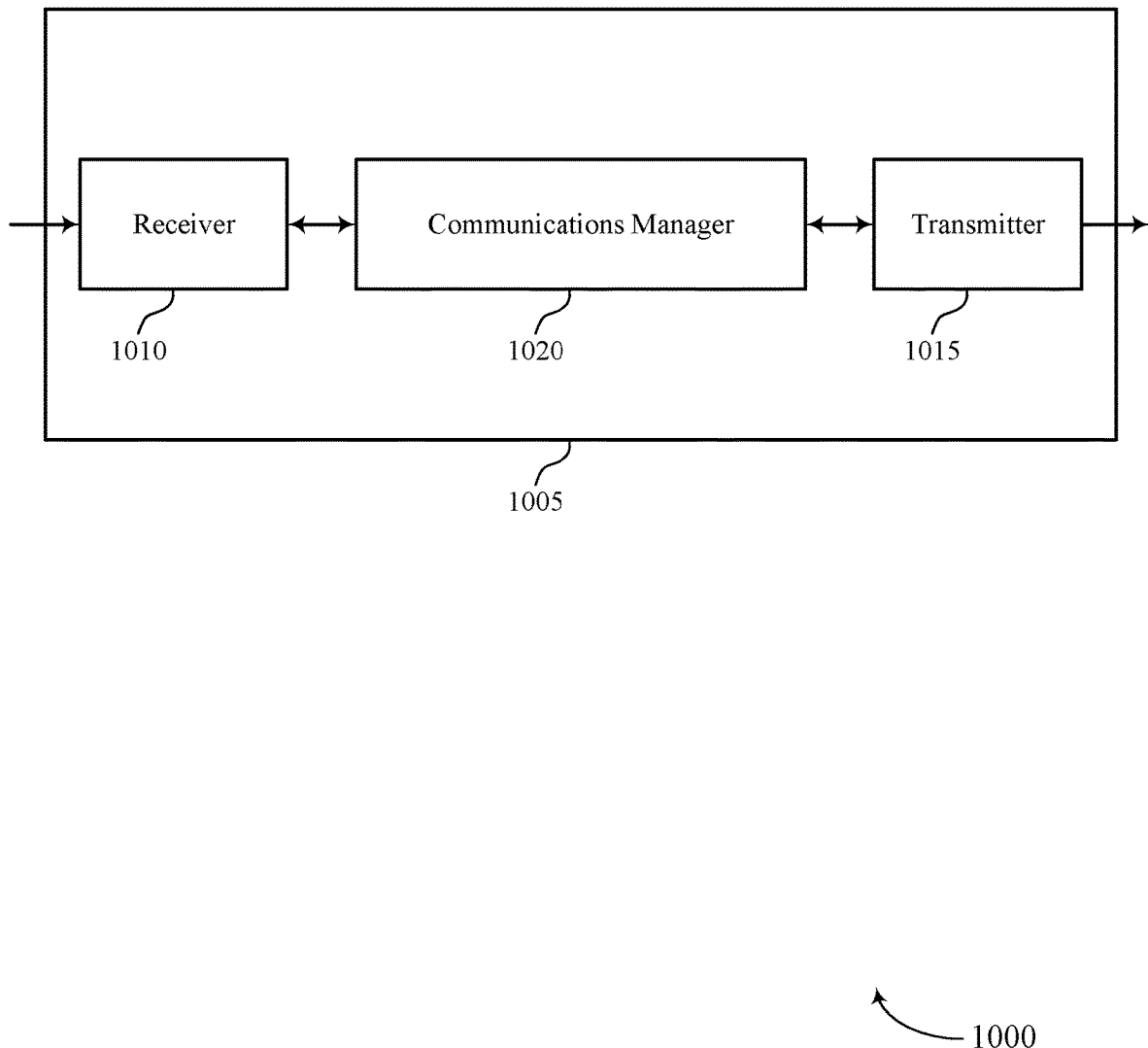
FIGS. 10 and 11 show block diagrams of devices that support sidelink assisted indication of beam failure in accordance with one or more aspects of the present disclosure.

FIG. 10 shows a block diagram 1000 of a device 1005 that supports sidelink assisted indication of beam failure in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of sidelink assisted indication of beam failure as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for receiving, from a first UE, a beam failure recovery request including an indication of whether a beam failure at a second UE is associated with a self-interference or a cross-link interference. The communications manager 1020 may be configured as or otherwise support a means for identifying one or more beam switching parameters based on the beam failure recovery request including the indication of whether the beam failure is associated with the self-interference or the cross-link interference. and. The communications manager 1020 may be configured as or otherwise support a means for transmitting a beam failure recovery response indicating the one or more beam switching parameters.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
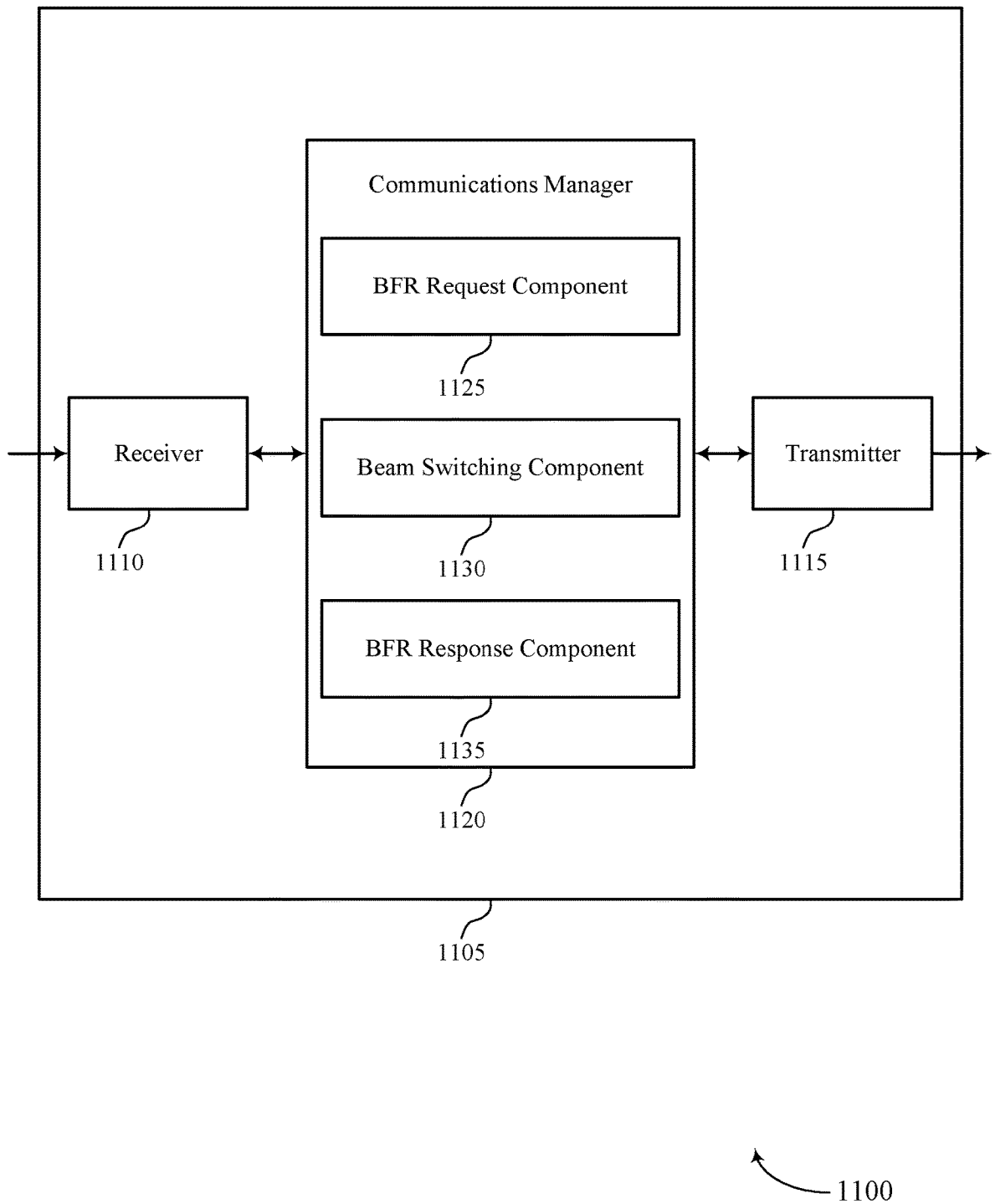

FIG. 11 shows a block diagram 1100 of a device 1105 that supports sidelink assisted indication of beam failure in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of sidelink assisted indication of beam failure as described herein. For example, the communications manager 1120 may include an BFR request component 1125, a beam switching component 1130, an BFR response component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The BFR request component 1125 may be configured as or otherwise support a means for receiving, from a first UE, a beam failure recovery request including an indication of whether a beam failure at a second UE is associated with a self-interference or a cross-link interference. The beam switching component 1130 may be configured as or otherwise support a means for identifying one or more beam switching parameters based on the beam failure recovery request including the indication of whether the beam failure is associated with the self-interference or the cross-link interference. and. The BFR response component 1135 may be configured as or otherwise support a means for transmitting a beam failure recovery response indicating the one or more beam switching parameters.

Figure 12:
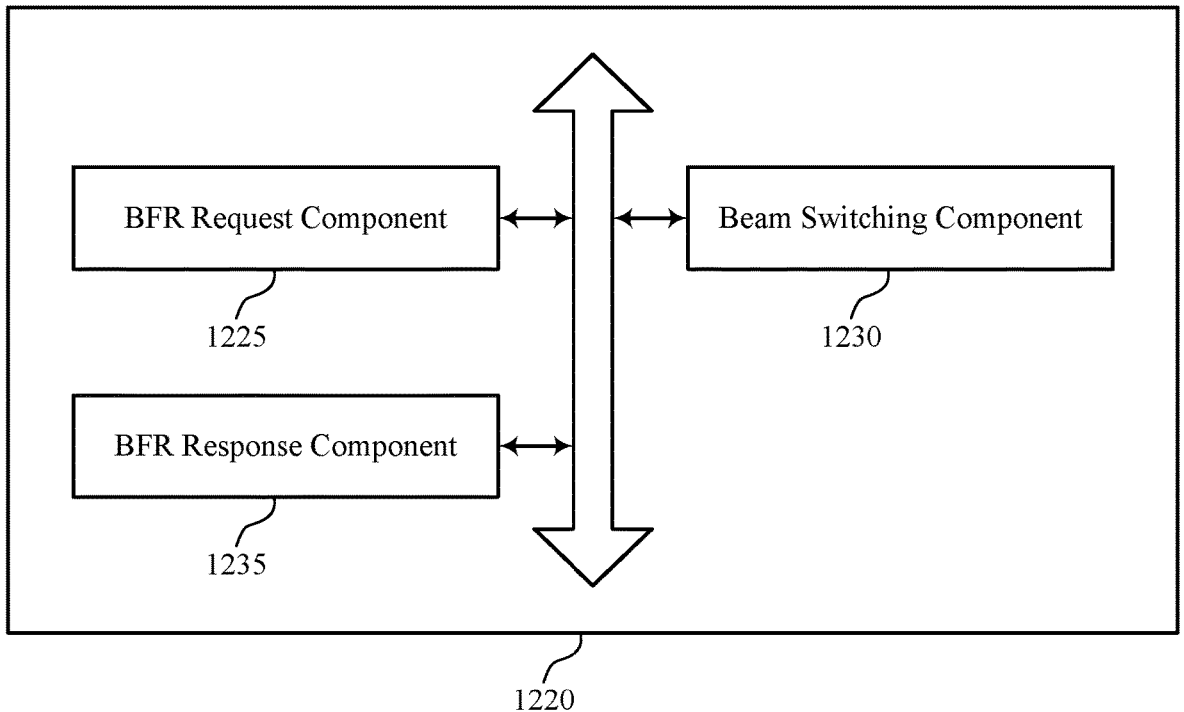
FIG. 12 shows a block diagram of a communications manager that supports sidelink assisted indication of beam failure in accordance with one or more aspects of the present disclosure.

FIG. 12 shows a block diagram 1200 of a communications manager 1220 that supports sidelink assisted indication of beam failure in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of sidelink assisted indication of beam failure as described herein. For example, the communications manager 1220 may include an BFR request component 1225, a beam switching component 1230, an BFR response component 1235, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The BFR request component 1225 may be configured as or otherwise support a means for receiving, from a first UE, a beam failure recovery request including an indication of whether a beam failure at a second UE is associated with a self-interference or a cross-link interference. The beam switching component 1230 may be configured as or otherwise support a means for identifying one or more beam switching parameters based on the beam failure recovery request including the indication of whether the beam failure is associated with the self-interference or the cross-link interference. and. The BFR response component 1235 may be configured as or otherwise support a means for transmitting a beam failure recovery response indicating the one or more beam switching parameters.

In some examples, to support transmitting the beam failure recovery response, the BFR response component 1235 may be configured as or otherwise support a means for transmitting the beam failure recovery response indicating a change in uplink beam or downlink beam for the second UE based on whether the beam failure is associated with the self-interference or the cross-link interference.

In some examples, to support transmitting the beam failure recovery response, the BFR response component 1235 may be configured as or otherwise support a means for transmitting the beam failure recovery response including a request for the second UE to switch from a full-duplex mode to a half-duplex mode.

In some examples, to support transmitting the beam failure recovery response, the BFR response component 1235 may be configured as or otherwise support a means for transmitting the beam failure recovery response initiating a beam training procedure using at least one of reference signal received power measurement resources, self-interference measurement resources, and cross-link interference measurement resources.

In some examples, to support transmitting the beam failure recovery response, the BFR response component 1235 may be configured as or otherwise support a means for transmitting the beam failure recovery response including a command to reduce power associated with an uplink beam at the second UE, where the beam failure recovery response is based on the beam failure being associated with the self-interference.

In some examples, to support transmitting the beam failure recovery response, the BFR response component 1235 may be configured as or otherwise support a means for transmitting the beam failure recovery response including a command for the second UE to switch a first uplink beam to a second uplink beam, where the first uplink beam has a greater signal interference with a downlink beam than the second uplink beam, and where the beam failure recovery response is based on the beam failure being associated with the self-interference.

In some examples, to support transmitting the beam failure recovery response, the BFR response component 1235 may be configured as or otherwise support a means for transmitting the beam failure recovery response including a trigger to initiate a process for uplink beam selection with signal interference measurement, where the beam failure recovery response is based on the beam failure being associated with the cross-link interference.

Figure 13:
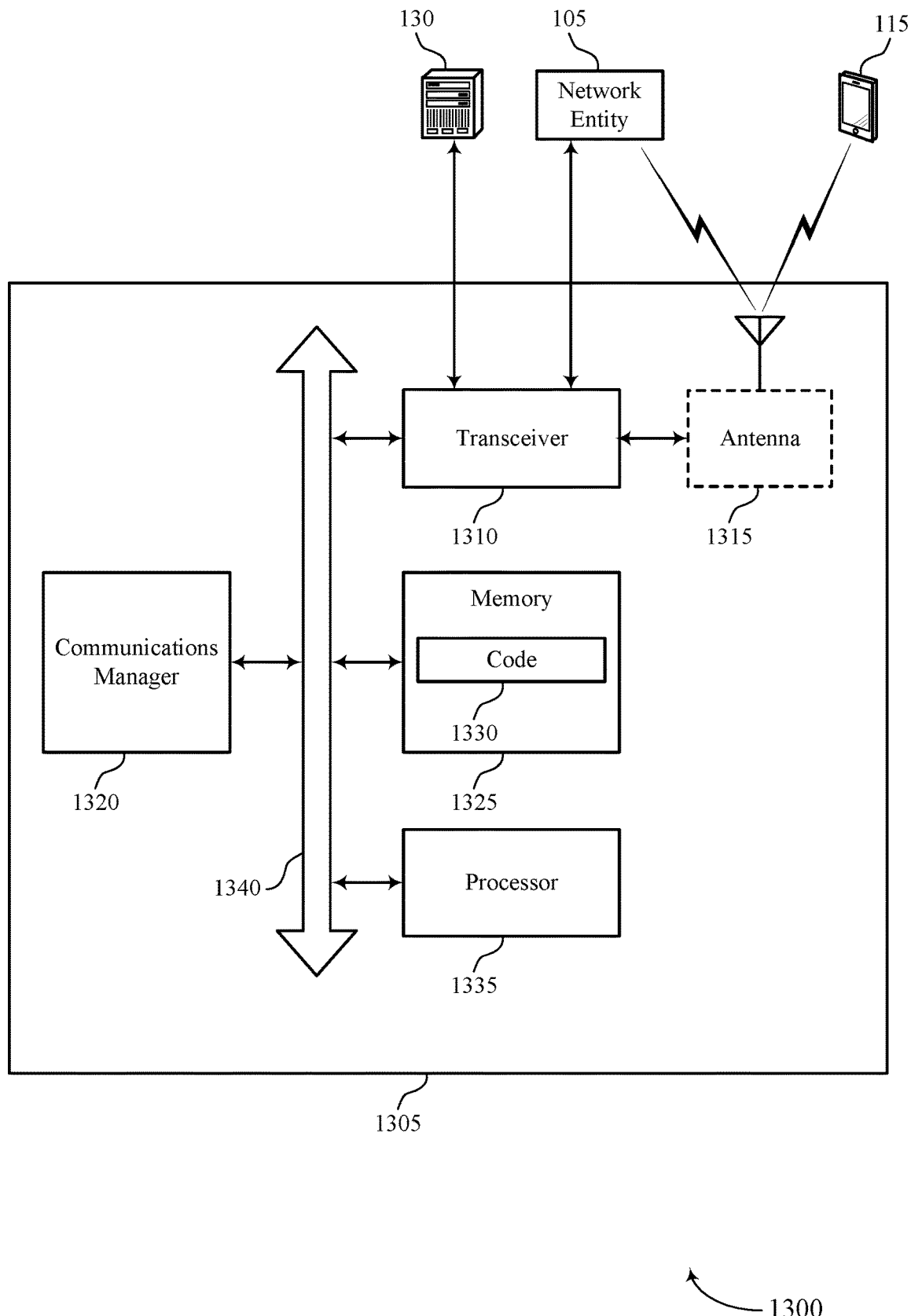
FIG. 13 shows a diagram of a system including a device that supports sidelink assisted indication of beam failure in accordance with one or more aspects of the present disclosure.

FIG. 13 shows a diagram of a system 1300 including a device 1305 that supports sidelink assisted indication of beam failure in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting sidelink assisted indication of beam failure). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links).

For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for receiving, from a first UE, a beam failure recovery request including an indication of whether a beam failure at a second UE is associated with a self-interference or a cross-link interference. The communications manager 1320 may be configured as or otherwise support a means for identifying one or more beam switching parameters based on the beam failure recovery request including the indication of whether the beam failure is associated with the self-interference or the cross-link interference. and. The communications manager 1320 may be configured as or otherwise support a means for transmitting a beam failure recovery response indicating the one or more beam switching parameters.

By including or configuring the communications manager 1320 in accordance with examples as described herein, the device 1305 may support techniques for improved communication reliability, reduced latency, improved user experience related to reduced processing, reduced power consumption, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of sidelink assisted indication of beam failure as described herein, or the processor 1335 and the memory 1325 may be otherwise configured to perform or support such operations.

Figure 14:
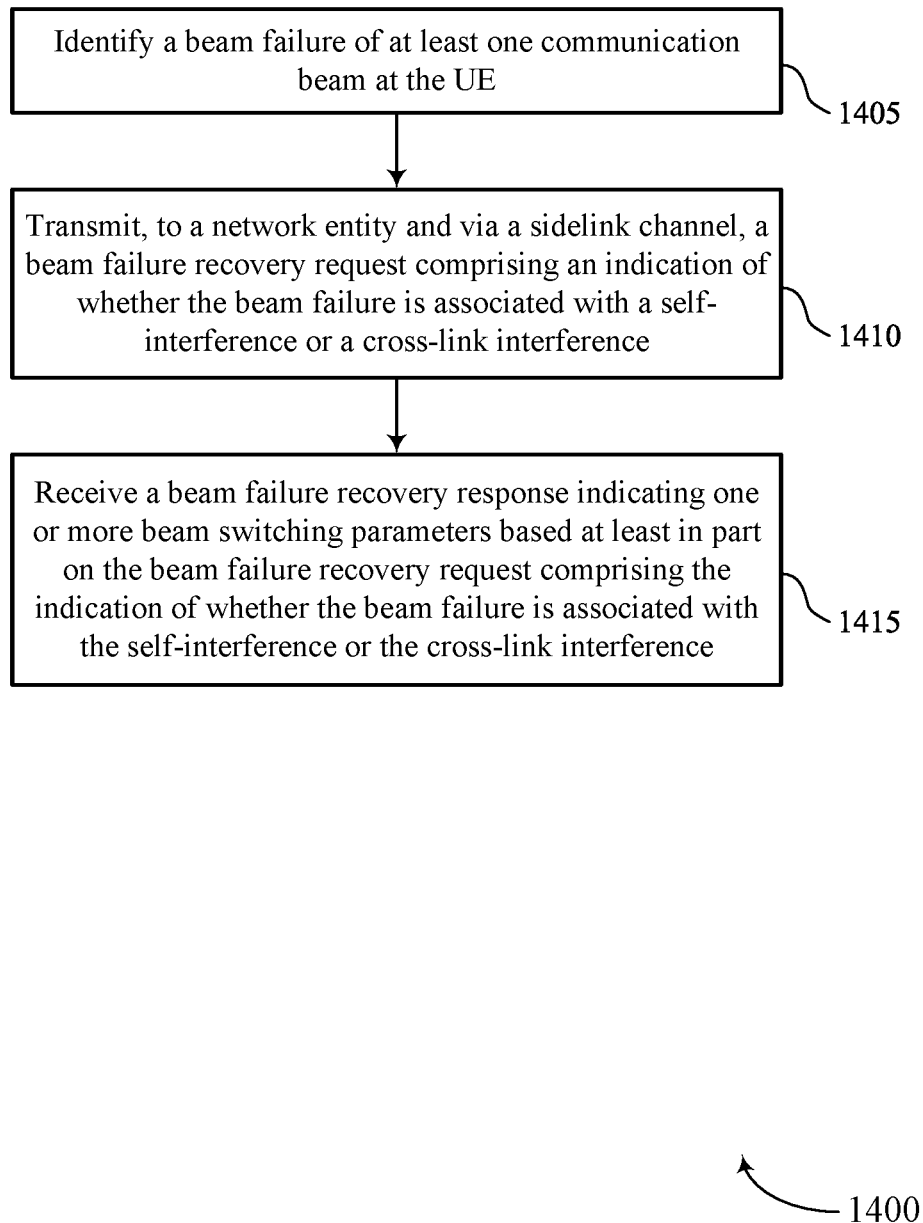
FIGS. 14 through 20 show flowcharts illustrating methods that support sidelink assisted indication of beam failure in accordance with one or more aspects of the present disclosure.

FIG. 14 shows a flowchart illustrating a method 1400 that supports sidelink assisted indication of beam failure in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include identifying a beam failure of at least one communication beam at the UE. The operations of 1405 may be performed in accordance with examples as disclosed herein. In some examples, aspects of the operations of 1405 may be performed by a beam failure component 825 as described with reference to FIG. 8.

At 1410, the method may include transmitting, to a network entity and via a sidelink channel, a beam failure recovery request including an indication of whether the beam failure is associated with a self-interference or a cross-link interference. The operations of 1410 may be performed in accordance with examples as disclosed herein. In some examples, aspects of the operations of 1410 may be performed by an BFR request component 830 as described with reference to FIG. 8.

At 1415, the method may include receiving a beam failure recovery response indicating one or more beam switching parameters based on the beam failure recovery request including the indication of whether the beam failure is associated with the self-interference or the cross-link interference. The operations of 1415 may be performed in accordance with examples as disclosed herein. In some examples, aspects of the operations of 1415 may be performed by an BFR response component 835 as described with reference to FIG. 8.

Figure 15:
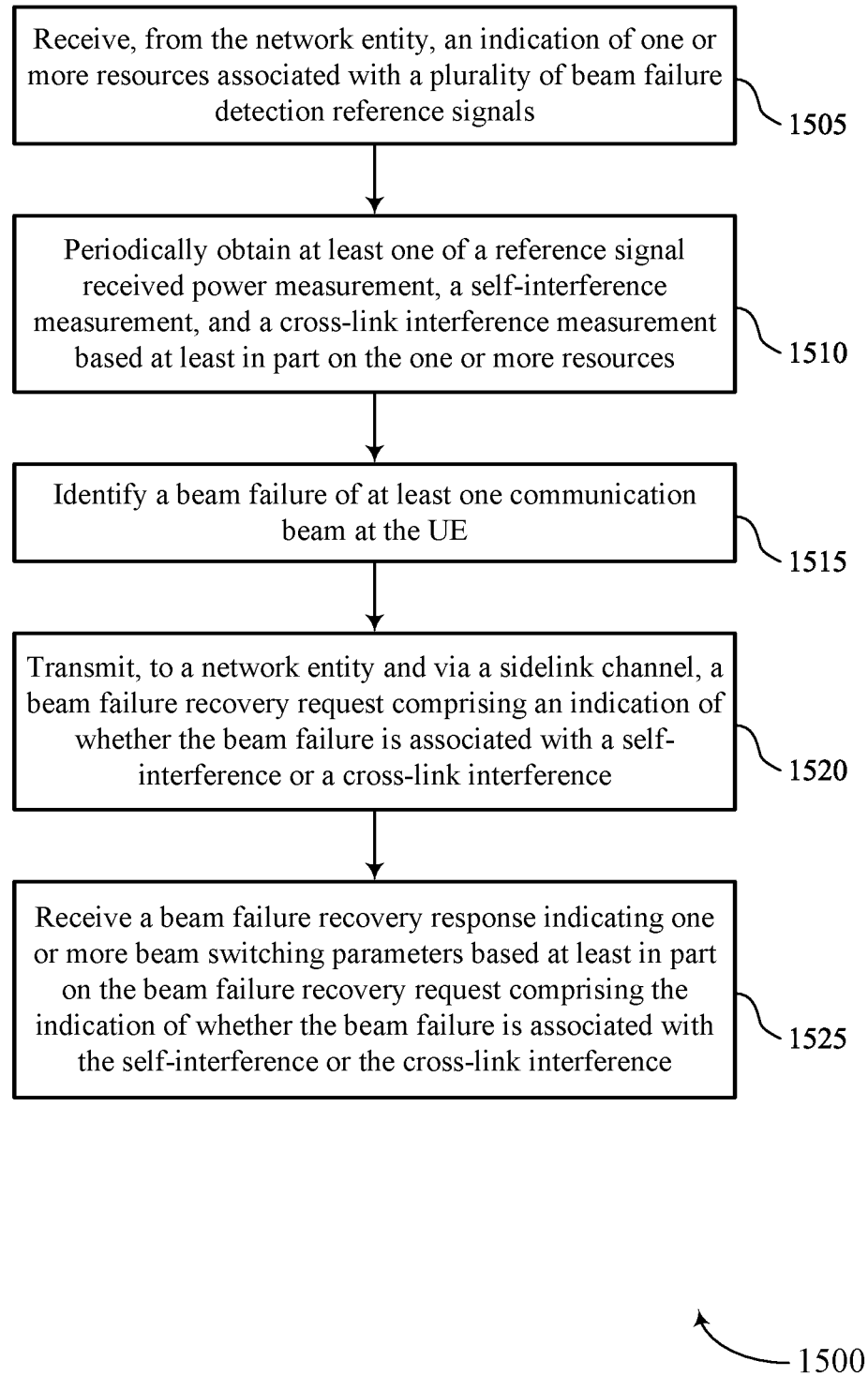

FIG. 15 shows a flowchart illustrating a method 1500 that supports sidelink assisted indication of beam failure in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from the network entity, an indication of one or more resources associated with a set of multiple beam failure detection reference signals. The operations of 1505 may be performed in accordance with examples as disclosed herein. In some examples, aspects of the operations of 1505 may be performed by a resource indication component 840 as described with reference to FIG. 8.

At 1510, the method may include periodically obtaining at least one of a reference signal received power measurement, a self-interference measurement, and a cross-link interference measurement based on the one or more resources. The operations of 1510 may be performed in accordance with examples as disclosed herein. In some examples, aspects of the operations of 1510 may be performed by a measurement component 845 as described with reference to FIG. 8.

At 1515, the method may include identifying a beam failure of at least one communication beam at the UE. The operations of 1515 may be performed in accordance with examples as disclosed herein. In some examples, aspects of the operations of 1515 may be performed by a beam failure component 825 as described with reference to FIG. 8.

At 1520, the method may include transmitting, to a network entity and via a sidelink channel, a beam failure recovery request including an indication of whether the beam failure is associated with a self-interference or a cross-link interference. The operations of 1520 may be performed in accordance with examples as disclosed herein. In some examples, aspects of the operations of 1520 may be performed by an BFR request component 830 as described with reference to FIG. 8.

At 1525, the method may include receiving a beam failure recovery response indicating one or more beam switching parameters based on the beam failure recovery request including the indication of whether the beam failure is associated with the self-interference or the cross-link interference. The operations of 1525 may be performed in accordance with examples as disclosed herein. In some examples, aspects of the operations of 1525 may be performed by an BFR response component 835 as described with reference to FIG. 8.

Figure 16:
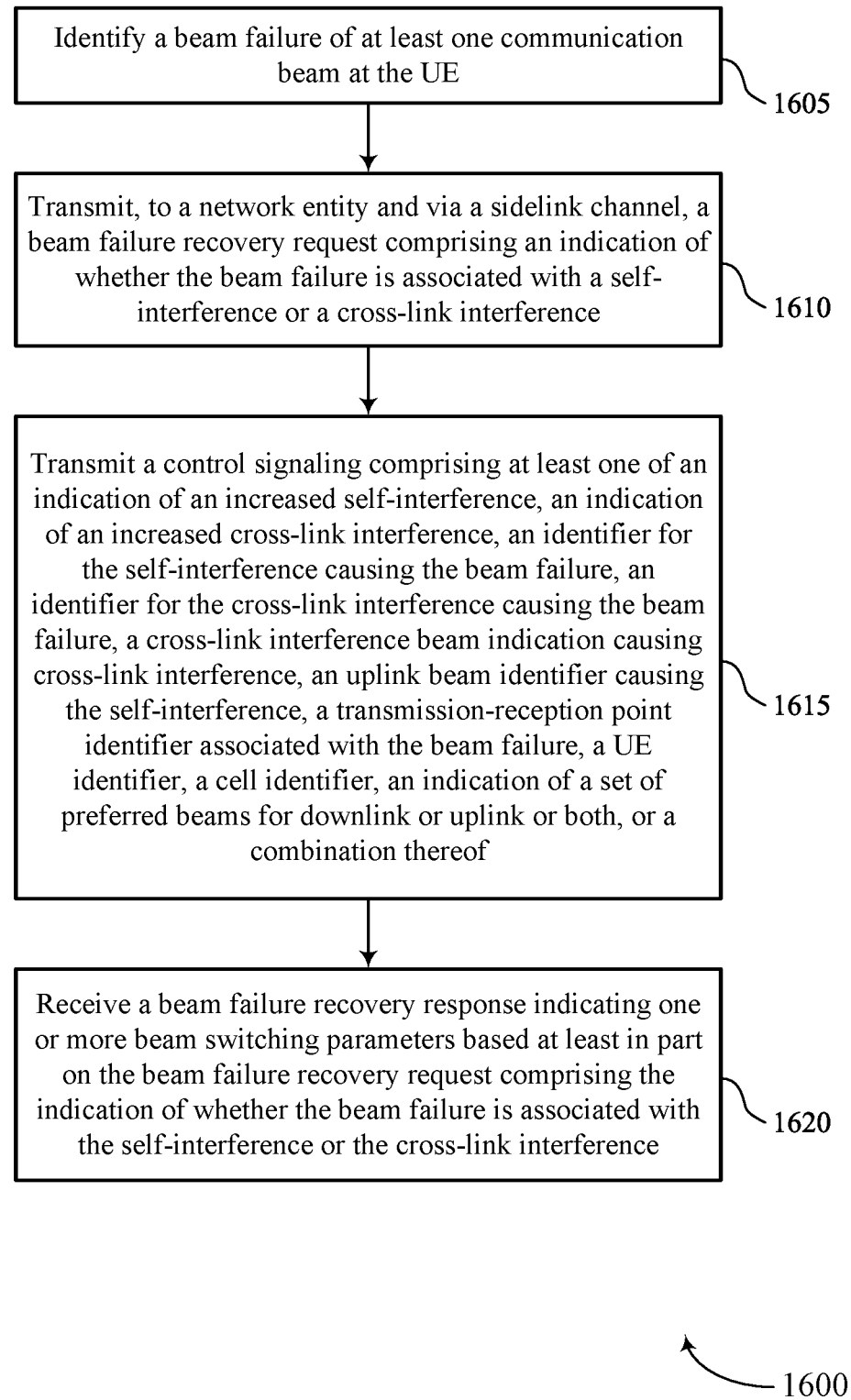

FIG. 16 shows a flowchart illustrating a method 1600 that supports sidelink assisted indication of beam failure in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include identifying a beam failure of at least one communication beam at the UE. The operations of 1605 may be performed in accordance with examples as disclosed herein. In some examples, aspects of the operations of 1605 may be performed by a beam failure component 825 as described with reference to FIG. 8.

At 1610, the method may include transmitting, to a network entity and via a sidelink channel, a beam failure recovery request including an indication of whether the beam failure is associated with a self-interference or a cross-link interference. The operations of 1610 may be performed in accordance with examples as disclosed herein. In some examples, aspects of the operations of 1610 may be performed by an BFR request component 830 as described with reference to FIG. 8.

At 1615, the method may include transmitting a control signaling including at least one of an indication of an increased self-interference, an indication of an increased cross-link interference, an identifier for the self-interference causing the beam failure, an identifier for the cross-link interference causing the beam failure, a cross-link interference beam indication causing cross-link interference, an uplink beam identifier causing the self-interference, a transmission-reception point identifier associated with the beam failure, a UE identifier, a cell identifier, an indication of a set of preferred beams for downlink or uplink or both, or a combination thereof. The operations of 1615 may be performed in accordance with examples as disclosed herein. In some examples, aspects of the operations of 1615 may be performed by an BFR request component 830 as described with reference to FIG. 8.

At 1620, the method may include receiving a beam failure recovery response indicating one or more beam switching parameters based on the beam failure recovery request including the indication of whether the beam failure is associated with the self-interference or the cross-link interference. The operations of 1620 may be performed in accordance with examples as disclosed herein. In some examples, aspects of the operations of 1620 may be performed by an BFR response component 835 as described with reference to FIG. 8.

Figure 17:
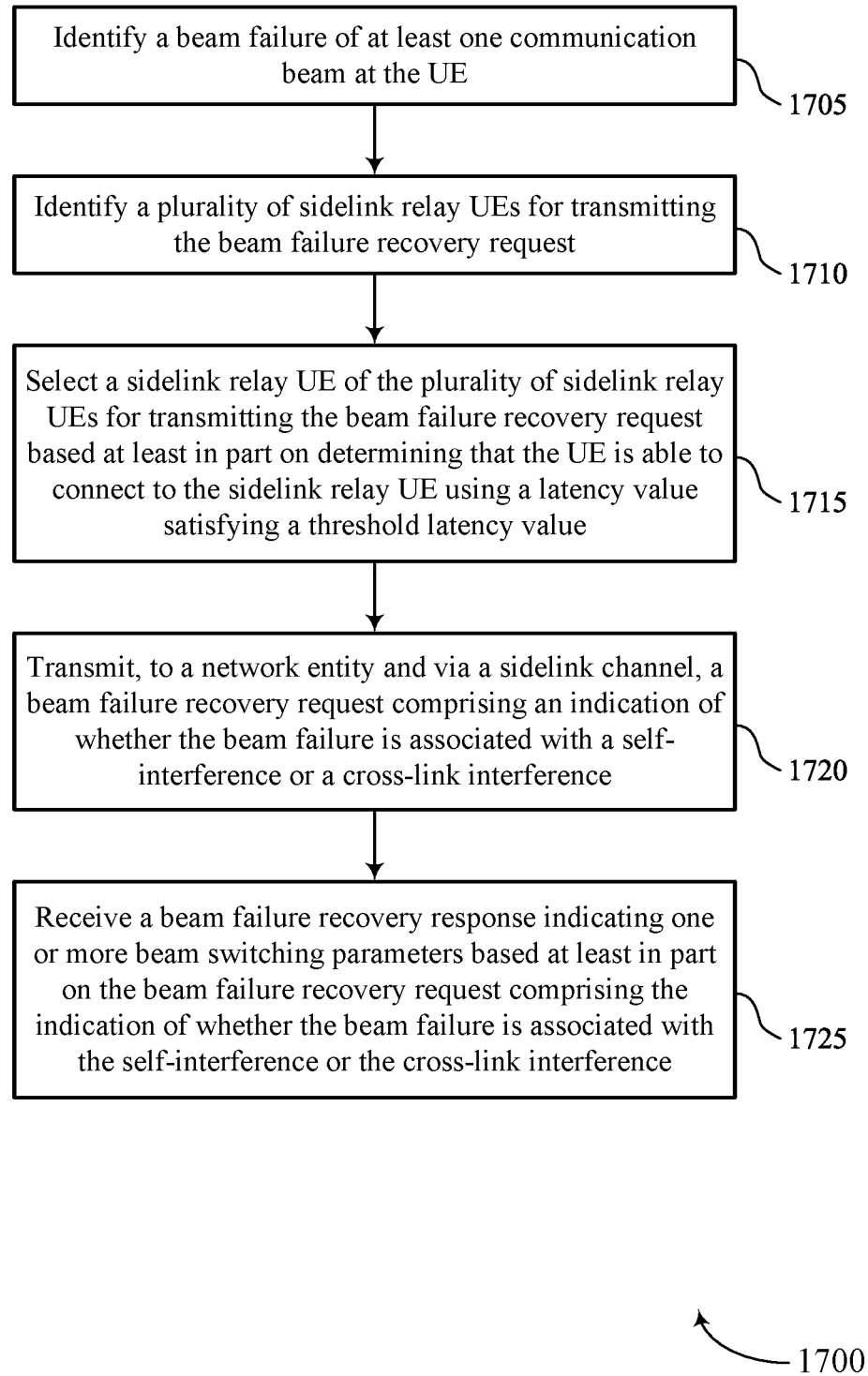

FIG. 17 shows a flowchart illustrating a method 1700 that supports sidelink assisted indication of beam failure in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include identifying a beam failure of at least one communication beam at the UE. The operations of 1705 may be performed in accordance with examples as disclosed herein. In some examples, aspects of the operations of 1705 may be performed by a beam failure component 825 as described with reference to FIG. 8.

At 1710, the method may include identifying a set of multiple sidelink relay UEs for transmitting the beam failure recovery request. The operations of 1710 may be performed in accordance with examples as disclosed herein. In some examples, aspects of the operations of 1710 may be performed by a UE identification component 850 as described with reference to FIG. 8.

At 1715, the method may include selecting a sidelink relay UE of the set of multiple sidelink relay UEs for transmitting the beam failure recovery request based on determining that the UE is able to connect to the sidelink relay UE using a latency value satisfying a threshold latency value. The operations of 1715 may be performed in accordance with examples as disclosed herein. In some examples, aspects of the operations of 1715 may be performed by a UE selection component 855 as described with reference to FIG. 8.

At 1720, the method may include transmitting, to a network entity and via a sidelink channel, a beam failure recovery request including an indication of whether the beam failure is associated with a self-interference or a cross-link interference. The operations of 1720 may be performed in accordance with examples as disclosed herein. In some examples, aspects of the operations of 1720 may be performed by an BFR request component 830 as described with reference to FIG. 8.

At 1725, the method may include receiving a beam failure recovery response indicating one or more beam switching parameters based on the beam failure recovery request including the indication of whether the beam failure is associated with the self-interference or the cross-link interference. The operations of 1725 may be performed in accordance with examples as disclosed herein. In some examples, aspects of the operations of 1725 may be performed by an BFR response component 835 as described with reference to FIG. 8.

Figure 18:
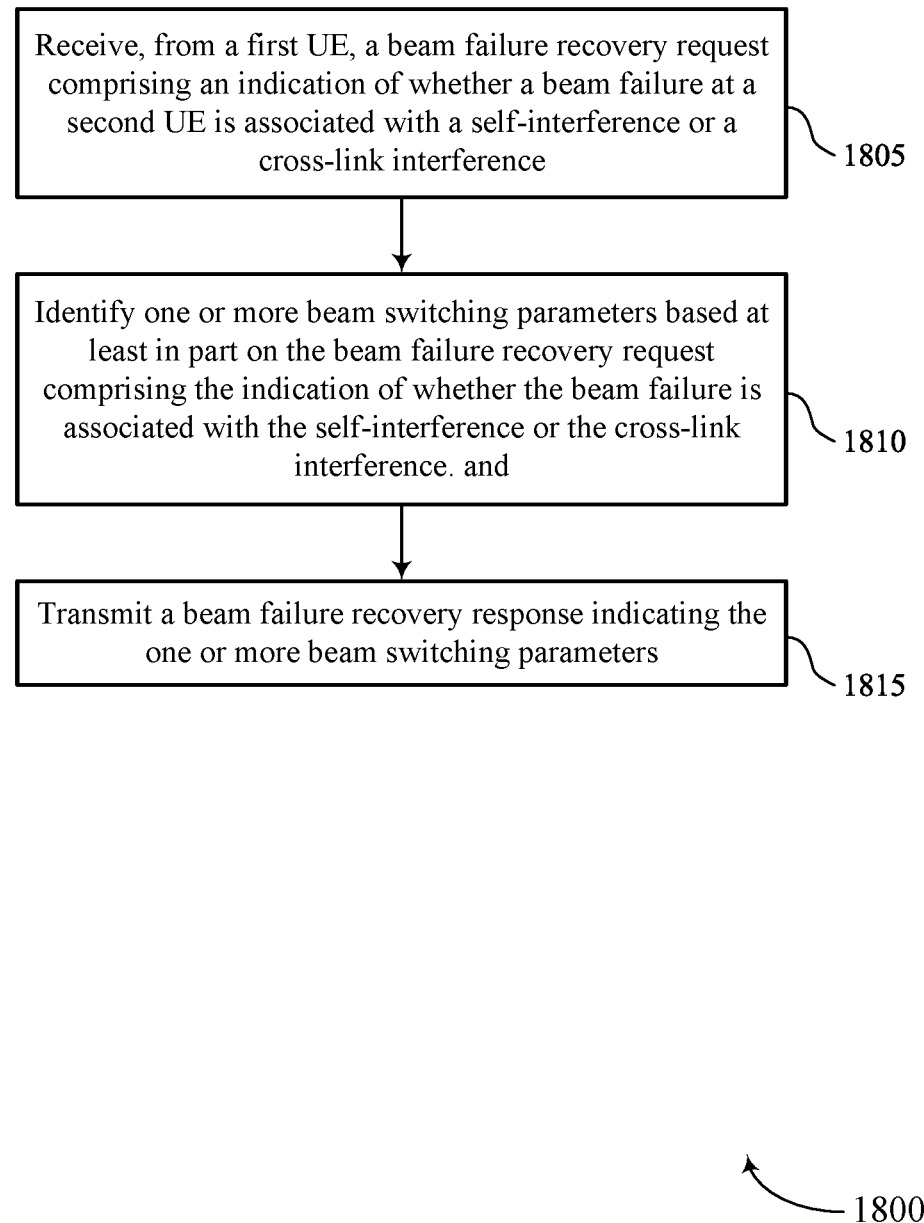

FIG. 18 shows a flowchart illustrating a method 1800 that supports sidelink assisted indication of beam failure in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a first UE, a beam failure recovery request including an indication of whether a beam failure at a second UE is associated with a self-interference or a cross-link interference. The operations of 1805 may be performed in accordance with examples as disclosed herein. In some examples, aspects of the operations of 1805 may be performed by an BFR request component 1225 as described with reference to FIG. 12.

At 1810, the method may include identifying one or more beam switching parameters based on the beam failure recovery request including the indication of whether the beam failure is associated with the self-interference or the cross-link interference. and. The operations of 1810 may be performed in accordance with examples as disclosed herein. In some examples, aspects of the operations of 1810 may be performed by a beam switching component 1230 as described with reference to FIG. 12.

At 1815, the method may include transmitting a beam failure recovery response indicating the one or more beam switching parameters. The operations of 1815 may be performed in accordance with examples as disclosed herein. In some examples, aspects of the operations of 1815 may be performed by an BFR response component 1235 as described with reference to FIG. 12.

Figure 19:
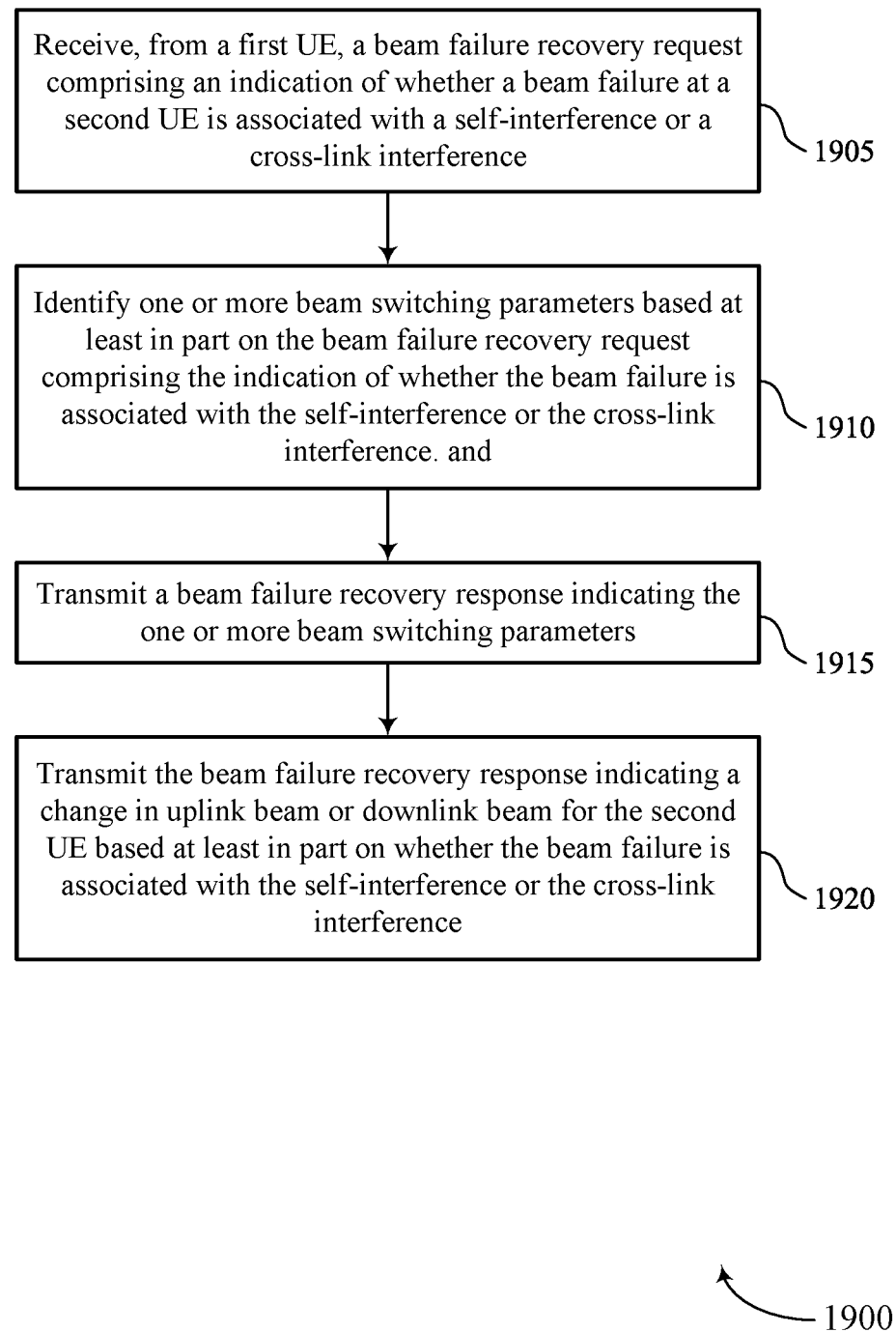

FIG. 19 shows a flowchart illustrating a method 1900 that supports sidelink assisted indication of beam failure in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include receiving, from a first UE, a beam failure recovery request including an indication of whether a beam failure at a second UE is associated with a self-interference or a cross-link interference. The operations of 1905 may be performed in accordance with examples as disclosed herein. In some examples, aspects of the operations of 1905 may be performed by an BFR request component 1225 as described with reference to FIG. 12.

At 1910, the method may include identifying one or more beam switching parameters based on the beam failure recovery request including the indication of whether the beam failure is associated with the self-interference or the cross-link interference. and. The operations of 1910 may be performed in accordance with examples as disclosed herein. In some examples, aspects of the operations of 1910 may be performed by a beam switching component 1230 as described with reference to FIG. 12.

At 1915, the method may include transmitting a beam failure recovery response indicating the one or more beam switching parameters. The operations of 1915 may be performed in accordance with examples as disclosed herein. In some examples, aspects of the operations of 1915 may be performed by an BFR response component 1235 as described with reference to FIG. 12.

At 1920, the method may include transmitting the beam failure recovery response indicating a change in uplink beam or downlink beam for the second UE based on whether the beam failure is associated with the self-interference or the cross-link interference. The operations of 1920 may be performed in accordance with examples as disclosed herein. In some examples, aspects of the operations of 1920 may be performed by an BFR response component 1235 as described with reference to FIG. 12.

Figure 20:
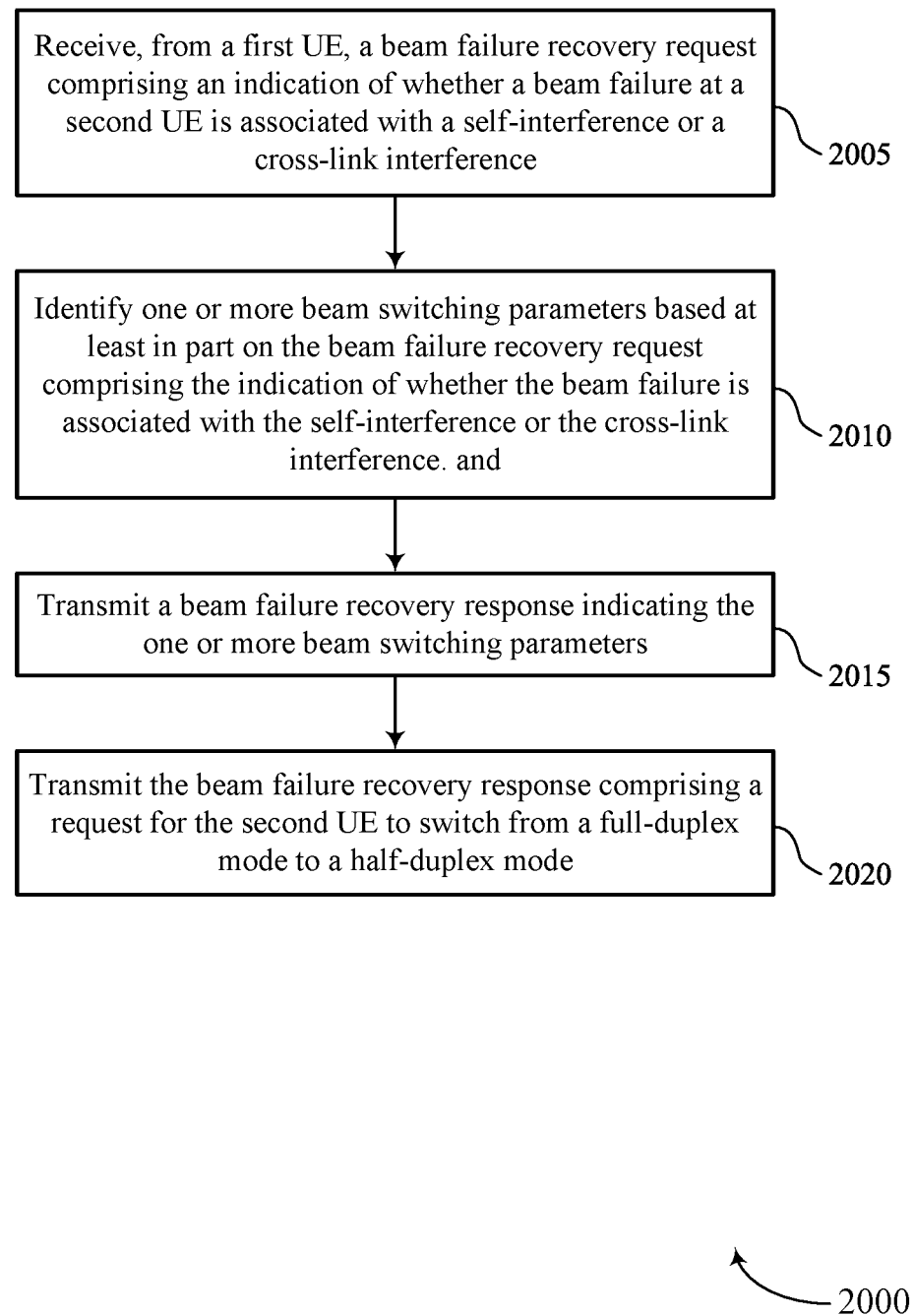

FIG. 20 shows a flowchart illustrating a method 2000 that supports sidelink assisted indication of beam failure in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include receiving, from a first UE, a beam failure recovery request including an indication of whether a beam failure at a second UE is associated with a self-interference or a cross-link interference. The operations of 2005 may be performed in accordance with examples as disclosed herein. In some examples, aspects of the operations of 2005 may be performed by an BFR request component 1225 as described with reference to FIG. 12.

At 2010, the method may include identifying one or more beam switching parameters based on the beam failure recovery request including the indication of whether the beam failure is associated with the self-interference or the cross-link interference. and. The operations of 2010 may be performed in accordance with examples as disclosed herein. In some examples, aspects of the operations of 2010 may be performed by a beam switching component 1230 as described with reference to FIG. 12.

At 2015, the method may include transmitting a beam failure recovery response indicating the one or more beam switching parameters. The operations of 2015 may be performed in accordance with examples as disclosed herein. In some examples, aspects of the operations of 2015 may be performed by an BFR response component 1235 as described with reference to FIG. 12.

At 2020, the method may include transmitting the beam failure recovery response including a request for the second UE to switch from a full-duplex mode to a half-duplex mode. The operations of 2020 may be performed in accordance with examples as disclosed herein. In some examples, aspects of the operations of 2020 may be performed by an BFR response component 1235 as described with reference to FIG. 12.

The following provides an overview of aspects of the present disclosure:

Aspect 1: A method for wireless communication at a UE, comprising: identifying a beam failure of at least one communication beam at the UE; transmitting, to a network entity and via a sidelink channel, a beam failure recovery request comprising an indication of whether the beam failure is associated with a self-interference or a cross-link interference; and receiving a beam failure recovery response indicating one or more beam switching parameters based at least in part on the beam failure recovery request comprising the indication of whether the beam failure is associated with the self-interference or the cross-link interference.

Aspect 2: The method of aspect 1, further comprising: receiving, from the network entity, an indication of one or more resources associated with a plurality of beam failure detection reference signals; and periodically obtaining at least one of a reference signal received power measurement, a self-interference measurement, and a cross-link interference measurement based at least in part on the one or more resources.

Aspect 3: The method of any of aspects 1 through 2, wherein transmitting the beam failure recovery request comprises: transmitting a control signaling comprising at least one of an indication of an increased self-interference, an indication of an increased cross-link interference, an identifier for the self-interference causing the beam failure, an identifier for the cross-link interference causing the beam failure, a cross-link interference beam indication causing cross-link interference, an uplink beam identifier causing the self-interference, a transmission-reception point identifier associated with the beam failure, a UE identifier, a cell identifier, an indication of a set of preferred beams for downlink or uplink or both, or a combination thereof Aspect 4: The method of any of aspects 1 through 3, further comprising: identifying a plurality of sidelink relay UEs for transmitting the beam failure recovery request; and selecting a sidelink relay UE of the plurality of sidelink relay UEs for transmitting the beam failure recovery request based at least in part on determining that the UE is able to connect to the sidelink relay UE using a latency value satisfying a threshold latency value.

Aspect 5: The method of aspect 4, further comprising: identifying the plurality of sidelink relay UEs for transmitting the beam failure recovery request based at least in part on each sidelink relay UE of the plurality of sidelink relay UEs being associated with at least one of a threshold sidelink latency, a threshold uplink latency, a threshold sidelink link quality, a threshold uplink link quality, sidelink relay mode setup parameters, a connectivity between each sidelink relay UE and the network entity, a connectivity between each sidelink relay UE and a second network entity, or a combination thereof Aspect 6: The method of any of aspects 4 through 5, wherein transmitting the beam failure recovery request further comprises: transmitting, to the sidelink relay UE of the plurality of sidelink relay UEs, the beam failure recovery request based at least in part on one or more conditions.

Aspect 7: The method of any of aspects 4 through 6, further comprising: receiving, from the network entity, an indication of the threshold latency value, wherein the threshold latency value is based at least in part on a random access channel configuration periodicity.

Aspect 8: The method of any of aspects 4 through 7, wherein the UE is able to connect to the sidelink relay UE using a sidelink grant or sensed sidelink resources.

Aspect 9: The method of any of aspects 1 through 8, further comprising: receiving, from a sidelink relay UE, an indication of at least one of an uplink grant availability at the sidelink relay UE, a periodicity associated with the uplink grant, an offset associated with the uplink grant, a delay to between two uplink grants, time and frequency resources per occasion, a physical layer uplink priority, or a combination thereof, wherein the uplink grant availability is based at least in part on a scheduling request information, a configured grant information, a dynamic grant information.

Aspect 10: The method of any of aspects 1 through 9, further comprising: receiving, from a sidelink relay UE, a signaling indicating a downlink quality or an estimated uplink quality or both for each cell identifier or network entity identifier associated with the sidelink relay UE, wherein the signaling comprises broadcast signaling or unicast signaling.

Aspect 11: The method of any of aspects 1 through 10, further comprising: receiving, from a sidelink relay UE, an indicator indicating a relaying capability of the sidelink relay UE, wherein the indicator is received periodically or periodically.

Aspect 12: The method of any of aspects 1 through 11, further comprising: receiving, from a sidelink relay UE, at least one of a distributed unit identifier, a transmission reception point identifier, a cell identifier, a network entity identifier, or a combination thereof Aspect 13: The method of any of aspects 1 through 12, wherein receiving the beam failure recovery response comprises: receiving the beam failure recovery response indicating a change in uplink beam or downlink beam for the UE based at least in part on whether the beam failure is associated with the self-interference or the cross-link interference.

Aspect 14: The method of any of aspects 1 through 13, wherein receiving the beam failure recovery response comprises: receiving the beam failure recovery response comprising a request for the UE to switch from a full-duplex mode to a half-duplex mode.

Aspect 15: The method of any of aspects 1 through 14, wherein receiving the beam failure recovery response comprises: receiving the beam failure recovery response initiating a beam training procedure using at least one of reference signal received power measurement resources, self-interference measurement resources, and cross-link interference measurement resources; and performing the beam training procedure to establish a second communication beam.

Aspect 16: The method of any of aspects 1 through 15, wherein receiving the beam failure recovery response comprises: receiving the beam failure recovery response comprising a command to reduce power associated with an uplink beam at the UE, wherein the beam failure recovery response is based at least in part on the beam failure being associated with the self-interference.

Aspect 17: The method of any of aspects 1 through 16, wherein receiving the beam failure recovery response comprises: receiving the beam failure recovery response comprising a command for the UE to switch a first uplink beam to a second uplink beam, wherein the first uplink beam has a greater signal interference with the at least one communication beam than the second uplink beam, and wherein the beam failure recovery response is based at least in part on the beam failure being associated with the self-interference.

Aspect 18: The method of aspect 17, further comprising: determining that a signal interference between the second uplink beam and the at least one communication beam is greater than a threshold value; and switching to a half-duplex mode from a full-duplex mode or canceling an uplink transmission based at least in part on the signal interference being greater than the threshold value.

Aspect 19: The method of any of aspects 1 through 18, wherein receiving the beam failure recovery response comprises: receiving the beam failure recovery response comprising a trigger to initiate a process for uplink beam selection with signal interference measurement, wherein the beam failure recovery response is based at least in part on the beam failure being associated with the cross-link interference.

Aspect 20: The method of any of aspects 1 through 19, further comprising: transmitting, to a second UE associated with the cross-link interference, a set of intermediate cross-link interference reports based at least in part on identifying the beam failure; identifying a set of beams satisfying a cross-link interference threshold based at least in part on transmitting the set of intermediate cross-link interference reports; and transmitting an indication of the set of beams satisfying the cross-link interference threshold.

Aspect 21: The method of aspect 20, wherein the indication of the set of beams satisfying the cross-link interference threshold is transmitted to the network entity from the UE or transmitted to the network entity via the second UE.

Aspect 22: A method for wireless communication at a network entity, comprising: receiving, from a first UE, a beam failure recovery request comprising an indication of whether a beam failure at a second UE is associated with a self-interference or a cross-link interference; identifying one or more beam switching parameters based at least in part on the beam failure recovery request comprising the indication of whether the beam failure is associated with the self-interference or the cross-link interference. and transmitting a beam failure recovery response indicating the one or more beam switching parameters.

Aspect 23: The method of aspect 22, wherein transmitting the beam failure recovery response comprises: transmitting the beam failure recovery response indicating a change in uplink beam or downlink beam for the second UE based at least in part on whether the beam failure is associated with the self-interference or the cross-link interference.

Aspect 24: The method of any of aspects 22 through 23, wherein transmitting the beam failure recovery response comprises: transmitting the beam failure recovery response comprising a request for the second UE to switch from a full-duplex mode to a half-duplex mode.

Aspect 25: The method of any of aspects 22 through 24, wherein transmitting the beam failure recovery response comprises: transmitting the beam failure recovery response initiating a beam training procedure using at least one of reference signal received power measurement resources, self-interference measurement resources, and cross-link interference measurement resources.

Aspect 26: The method of any of aspects 22 through 25, wherein transmitting the beam failure recovery response comprises: transmitting the beam failure recovery response comprising a command to reduce power associated with an uplink beam at the second UE, wherein the beam failure recovery response is based at least in part on the beam failure being associated with the self-interference.

Aspect 27: The method of any of aspects 22 through 26, wherein transmitting the beam failure recovery response comprises: transmitting the beam failure recovery response comprising a command for the second UE to switch a first uplink beam to a second uplink beam, wherein the first uplink beam has a greater signal interference with a downlink beam than the second uplink beam, and wherein the beam failure recovery response is based at least in part on the beam failure being associated with the self-interference.

Aspect 28: The method of any of aspects 22 through 27, wherein transmitting the beam failure recovery response comprises: transmitting the beam failure recovery response comprising a trigger to initiate a process for uplink beam selection with signal interference measurement, wherein the beam failure recovery response is based at least in part on the beam failure being associated with the cross-link interference.

Aspect 29: An apparatus for wireless communication at a UE, comprising a processor; memory coupled with the processor; and instructions stored in the memory and executable by the processor to cause the apparatus to perform a method of any of aspects 1 through 21.

Aspect 30: An apparatus for wireless communication at a UE, comprising at least one means for performing a method of any of aspects 1 through 21.

Aspect 31: A non-transitory computer-readable medium storing code for wireless communication at a UE, the code comprising instructions executable by a processor to perform a method of any of aspects 1 through 21.

Aspect 32: An apparatus for wireless communication at a network entity, comprising a processor; memory coupled with the processor; and instructions stored in the memory and executable by the processor to cause the apparatus to perform a method of any of aspects 22 through 28.

Aspect 33: An apparatus for wireless communication at a network entity, comprising at least one means for performing a method of any of aspects 22 through 28.

Aspect 34: A non-transitory computer-readable medium storing code for wireless communication at a network entity, the code comprising instructions executable by a processor to perform a method of any of aspects 22 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      identify a beam failure of at least one communication beam at the UE;
      transmit, to a network entity and via a sidelink channel, a beam failure recovery request comprising an indication of whether the beam failure is associated with a self-interference or a cross-link interference; and
      receive a beam failure recovery response indicating one or more beam switching parameters based at least in part on the beam failure recovery request comprising the indication of whether the beam failure is associated with the self-interference or the cross-link interference.

2. The apparatus of claim 1, wherein the instructions are further executable by the processor to cause the apparatus to:
   receive, from the network entity, an indication of one or more resources associated with a plurality of beam failure detection reference signals; and
   periodically obtain at least one of a reference signal received power measurement, a self-interference measurement, and a cross-link interference measurement based at least in part on the one or more resources.

3. The apparatus of claim 1, wherein the instructions to transmit the beam failure recovery request are executable by the processor to cause the apparatus to:
   transmit a control signaling comprising at least one of an indication of an increased self-interference, an indication of an increased cross-link interference, an identifier for the self-interference causing the beam failure, an identifier for the cross-link interference causing the beam failure, a cross-link interference beam indication causing cross-link interference, an uplink beam identifier causing the self-interference, a transmission-reception point identifier associated with the beam failure, a UE identifier, a cell identifier, an indication of a set of preferred beams for downlink or uplink or both, or a combination thereof.

4. The apparatus of claim 1, wherein the instructions are further executable by the processor to cause the apparatus to:
   identify a plurality of sidelink relay UEs for transmitting the beam failure recovery request; and
   select a sidelink relay UE of the plurality of sidelink relay UEs for transmitting the beam failure recovery request based at least in part on determining that the UE is able to connect to the sidelink relay UE using a latency value satisfying a threshold latency value.

5. The apparatus of claim 4, wherein the instructions are further executable by the processor to cause the apparatus to:
   identify the plurality of sidelink relay UEs for transmitting the beam failure recovery request based at least in part on each sidelink relay UE of the plurality of sidelink relay UEs being associated with at least one of a threshold sidelink latency, a threshold uplink latency, a threshold sidelink link quality, a threshold uplink link quality, sidelink relay mode setup parameters, a connectivity between each sidelink relay UE and the network entity, a connectivity between each sidelink relay UE and a second network entity, or a combination thereof.

6. The apparatus of claim 4, wherein the instructions to transmit the beam failure recovery request are further executable by the processor to cause the apparatus to:
   transmit, to the sidelink relay UE of the plurality of sidelink relay UEs, the beam failure recovery request based at least in part on one or more conditions.

7. The apparatus of claim 4, wherein the instructions are further executable by the processor to cause the apparatus to:
   receive, from the network entity, an indication of the threshold latency value, wherein the threshold latency value is based at least in part on a random access channel configuration periodicity.

8. The apparatus of claim 4, wherein the UE is able to connect to the sidelink relay UE using a sidelink grant or sensed sidelink resources.

9. The apparatus of claim 1, wherein the instructions are further executable by the processor to cause the apparatus to:
   receive, from a sidelink relay UE, an indication of at least one of an uplink grant availability at the sidelink relay UE, a periodicity associated with the uplink grant, an offset associated with the uplink grant, a delay to between two uplink grants, time and frequency resources per occasion, a physical layer uplink priority, or a combination thereof, wherein the uplink grant availability is based at least in part on a scheduling request information, a configured grant information, a dynamic grant information.

10. The apparatus of claim 1, wherein the instructions are further executable by the processor to cause the apparatus to:
    receive, from a sidelink relay UE, a signaling indicating a downlink quality or an estimated uplink quality or both for each cell identifier or network entity identifier associated with the sidelink relay UE, wherein the signaling comprises broadcast signaling or unicast signaling.

11. The apparatus of claim 1, wherein the instructions are further executable by the processor to cause the apparatus to:
receive, from a sidelink relay UE, an indicator indicating a relaying capability of the sidelink relay UE, wherein the indicator is received periodically or periodically.

12. The apparatus of claim 1, wherein the instructions are further executable by the processor to cause the apparatus to:
receive, from a sidelink relay UE, at least one of a distributed unit identifier, a transmission reception point identifier, a cell identifier, a network entity identifier, or a combination thereof.

13. The apparatus of claim 1, wherein the instructions to receive the beam failure recovery response are executable by the processor to cause the apparatus to:
receive the beam failure recovery response indicating a change in uplink beam or downlink beam for the UE based at least in part on whether the beam failure is associated with the self-interference or the cross-link interference.

14. The apparatus of claim 1, wherein the instructions to receive the beam failure recovery response are executable by the processor to cause the apparatus to:
receive the beam failure recovery response comprising a request for the UE to switch from a full-duplex mode to a half-duplex mode.

15. The apparatus of claim 1, wherein the instructions to receive the beam failure recovery response are executable by the processor to cause the apparatus to:
receive the beam failure recovery response initiating a beam training procedure using at least one of reference signal received power measurement resources, self-interference measurement resources, and cross-link interference measurement resources; and
perform the beam training procedure to establish a second communication beam.

16. The apparatus of claim 1, wherein the instructions to receive the beam failure recovery response are executable by the processor to cause the apparatus to:
receive the beam failure recovery response comprising a command to reduce power associated with an uplink beam at the UE, wherein the beam failure recovery response is based at least in part on the beam failure being associated with the self-interference.

17. The apparatus of claim 1, wherein the instructions to receive the beam failure recovery response are executable by the processor to cause the apparatus to:
receive the beam failure recovery response comprising a command for the UE to switch a first uplink beam to a second uplink beam, wherein the first uplink beam has a greater signal interference with the at least one communication beam than the second uplink beam, and wherein the beam failure recovery response is based at least in part on the beam failure being associated with the self-interference.

18. The apparatus of claim 17, wherein the instructions are further executable by the processor to cause the apparatus to:
determine that a signal interference between the second uplink beam and the at least one communication beam is greater than a threshold value; and
switch to a half-duplex mode from a full-duplex mode or canceling an uplink transmission based at least in part on the signal interference being greater than the threshold value.

19. The apparatus of claim 1, wherein the instructions to receive the beam failure recovery response are executable by the processor to cause the apparatus to:
receive the beam failure recovery response comprising a trigger to initiate a process for uplink beam selection with signal interference measurement, wherein the beam failure recovery response is based at least in part on the beam failure being associated with the cross-link interference.

20. The apparatus of claim 1, wherein the instructions are further executable by the processor to cause the apparatus to:
transmit, to a second UE associated with the cross-link interference, a set of intermediate cross-link interference reports based at least in part on identifying the beam failure;
identify a set of beams satisfying a cross-link interference threshold based at least in part on transmitting the set of intermediate cross-link interference reports; and
transmit an indication of the set of beams satisfying the cross-link interference threshold.

21. The apparatus of claim 20, wherein the indication of the set of beams satisfying the cross-link interference threshold is transmitted to the network entity from the UE or transmitted to the network entity via the second UE.

22. An apparatus for wireless communication at a network entity, comprising:
a processor;
memory coupled with the processor; and
instructions stored in the memory and executable by the processor to cause the apparatus to:
receive, from a first user equipment (UE), a beam failure recovery request comprising an indication of whether a beam failure at a second UE is associated with a self-interference or a cross-link interference;
identify one or more beam switching parameters based at least in part on the beam failure recovery request comprising the indication of whether the beam failure is associated with the self-interference or the cross-link interference; and
transmit a beam failure recovery response indicating the one or more beam switching parameters.

23. The apparatus of claim 22, wherein the instructions to transmit the beam failure recovery response are executable by the processor to cause the apparatus to:
transmit the beam failure recovery response indicating a change in uplink beam or downlink beam for the second UE based at least in part on whether the beam failure is associated with the self-interference or the cross-link interference.

24. The apparatus of claim 22, wherein the instructions to transmit the beam failure recovery response are executable by the processor to cause the apparatus to:
transmit the beam failure recovery response comprising a request for the second UE to switch from a full-duplex mode to a half-duplex mode.

25. The apparatus of claim 22, wherein the instructions to transmit the beam failure recovery response are executable by the processor to cause the apparatus to:
transmit the beam failure recovery response initiating a beam training procedure using at least one of reference signal received power measurement resources, self-interference measurement resources, and cross-link interference measurement resources.

26. The apparatus of claim 22, wherein the instructions to transmit the beam failure recovery response are executable by the processor to cause the apparatus to:

transmit the beam failure recovery response comprising a command to reduce power associated with an uplink beam at the second UE, wherein the beam failure recovery response is based at least in part on the beam failure being associated with the self-interference.

27. The apparatus of claim 22, wherein the instructions to transmit the beam failure recovery response are executable by the processor to cause the apparatus to:
transmit the beam failure recovery response comprising a command for the second UE to switch a first uplink beam to a second uplink beam, wherein the first uplink beam has a greater signal interference with a downlink beam than the second uplink beam, and wherein the beam failure recovery response is based at least in part on the beam failure being associated with the self-interference.

28. The apparatus of claim 22, wherein the instructions to transmit the beam failure recovery response are executable by the processor to cause the apparatus to:
transmit the beam failure recovery response comprising a trigger to initiate a process for uplink beam selection with signal interference measurement, wherein the beam failure recovery response is based at least in part on the beam failure being associated with the cross-link interference.

29. A method for wireless communication at a user equipment (UE), comprising:
identifying a beam failure of at least one communication beam at the UE;
transmitting, to a network entity and via a sidelink channel, a beam failure recovery request comprising an indication of whether the beam failure is associated with a self-interference or a cross-link interference; and
receiving a beam failure recovery response indicating one or more beam switching parameters based at least in part on the beam failure recovery request comprising the indication of whether the beam failure is associated with the self-interference or the cross-link interference.

30. A method for wireless communication at a network entity, comprising:
receiving, from a first user equipment (UE), a beam failure recovery request comprising an indication of whether a beam failure at a second UE is associated with a self-interference or a cross-link interference;
identifying one or more beam switching parameters based at least in part on the beam failure recovery request comprising the indication of whether the beam failure is associated with the self-interference or the cross-link interference; and
transmitting a beam failure recovery response indicating the one or more beam switching parameters.

* * * * *